United States Patent
Takeda et al.

(10) Patent No.: US 8,603,619 B2
(45) Date of Patent: Dec. 10, 2013

(54) HEAT-RESISTANT BRITTLE LABEL

(75) Inventors: Koudai Takeda, Toyama (JP); Osamu Tanaka, Toyama (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/543,271

(22) Filed: Jul. 6, 2012

(65) Prior Publication Data

US 2012/0276359 A1 Nov. 1, 2012

Related U.S. Application Data

(62) Division of application No. 12/670,288, filed as application No. PCT/JP2008/057130 on Apr. 11, 2008, now abandoned.

(30) Foreign Application Priority Data

Jul. 23, 2007 (JP) .................................. 2007-191330

(51) Int. Cl.
| | |
|---|---|
| B32B 3/00 | (2006.01) |
| B32B 5/16 | (2006.01) |
| B32B 27/00 | (2006.01) |
| B32B 37/00 | (2006.01) |
| G03F 7/00 | (2006.01) |
| B44C 1/17 | (2006.01) |
| B23K 26/00 | (2006.01) |

(52) U.S. Cl.
USPC ........ 428/220; 428/204; 430/270.1; 430/945; 156/238; 156/272.8; 219/121.69; 219/121.68

(58) Field of Classification Search
USPC ........ 428/204, 220; 430/270.1, 945; 156/238, 156/272.8; 219/121.68, 121.69
See application file for complete search history.

(56) References Cited

U.S. PATENT DOCUMENTS 6,617,094 B2    9/2003   Ozawa et al.

FOREIGN PATENT DOCUMENTS

| JP | 9-123606 | 5/1997 |
|---|---|---|
| JP | 9-123607 | 5/1997 |
| JP | 2007-021818 | 2/2007 |
| JP | 2007021818 A * | 2/2007 |
| JP | 2007-106087 | 4/2007 |
| JP | 2007106087 A * | 4/2007 |

OTHER PUBLICATIONS

Machine Translation via JPO of JP 2007-106087, Takao et al. found in file for parent U.S. Appl. No. 12/670,288.*
Machine Translation via JPO of JP 2007-021818, Fukuda et al. found in file for parent U.S. Appl. No. 12/670,288.*
Notice of Rejection mailed Oct. 2, 2012 by the Japanese Patent Office in Japanese Patent Application No. 2009-524413 with English translation, 4 pages.

(Continued)

*Primary Examiner* — Mark Ruthkosky
*Assistant Examiner* — Laura C Dettinger
(74) *Attorney, Agent, or Firm* — Young & Thompson

(57) ABSTRACT

A laser-markable, acrylic resin-based laminate having a thickness of 100 to 200 μm and including (A3) a pigmented layer made of a crosslinked acrylic resin obtained by crosslinking an acrylic resin composition having a hydroxyl value of 10 to 100 mg KOH/g, (B3) a base layer made of a crosslinked acrylic resin obtained by crosslinking an acrylic resin composition having a hydroxyl value of 18 to 40 mg KOH/g, and (C3) a destructible layer made of a crosslinked acrylic resin obtained by crosslinking a mixture of an acrylic resin composition having a hydroxyl value of 20 to 35 mg KOH/g and polymer beads.

5 Claims, 2 Drawing Sheets

(56) References Cited

OTHER PUBLICATIONS

Chinese Office Action mailed Sep. 30, 2010 in corresponding Chinese Application No. 200880025456.6 and English translation of Chinese Office Action.

International Search Report, PCT/JP2008/057130, Jun. 10, 2008.
Takao Kinihiro et al., "Laminated Body for Laser Printing", Apr. 26, 2007, JP 2007-106087, Machine Translation.
Fukuda Takeshi et al., Brittle Laminate for Laser Printing, Feb. 1, 2007, JP 2007-021818, Machine Translation.

* cited by examiner

HEAT-RESISTANT BRITTLE LABEL

CROSS REFERENCE TO RELATED APPLICATIONS

This application is a division of co-pending application Ser. No. 12/670,288 filed on Jan. 22, 2010, which is a National Stage of PCT/JP2008/057130 filed on Apr. 11, 2008 which claims foreign priority to Japanese Application No's 2007-191330, 2006-283051 and 2006-283052 filed on Jul. 23, 2007, Oct. 17, 2006 and Oct. 17, 2006, respectively. The entire content of each of these applications is hereby expressly incorporated by reference.

TECHNICAL FIELD

This invention relates to a laser-markable laminate that can be marked with laser light. More particularly, it relates to a laser-markable laminate that is convenient to be attached to a substrate and, after attachment to a substrate, withstands long use under a high temperature condition, particularly at or above 150° C. and becomes non-reusable on being peeled off the substrate.

BACKGROUND ART

It is widely practiced to attach a label or a sheet printed with product information, such as product number and expiration date, to individual products for product management or for quality guarantee.

Currently available label printing methods include applying liquid ink using a printing plate, thermal transfer using ink ribbon, and inkjet printing. These methods have difficulty, however, in providing a large number of products with individually different information.

Hence, patent documents 1 and 2 (see below) propose a laser-markable laminate comprising a substrate, a base layer, and a hiding layer that absorbs laser light to generate heat and ablates. The colors of the base layer and the hiding layer are combined so that these layers may easily be visually distinguished. When the laminate is imagewise irradiated with a laser beam from the hiding layer side, the irradiated part of the hiding layer is removed to expose the color of the base layer in the form of, for example, letters.

Labels laser-marked with a product serial number and other identifying information are used for certification labeling or approval labeling of machines or automobile parts, and the like. When the label is used in, for example, an engine compartment, the use temperature can elevate to 50° C. or even higher. Labels, such as certification labels, that are attached to any part of the exterior and interior sides of an automobile can be subjected to strong direct sunlight or a severe temperature environment in the tropical or desert regions.

When used under such a severe temperature condition, an ordinary laser-marked label forms a crack or curls, resulting in destruction before the expiration of the usable life of the machine or part.

Using an ordinary label as a laminate for laser marking has been attempted but turned out to be impractical due to poor markability and handling properties.

It is conceivable to use a commonly employed heat resistant resin, such as a polyimide resin or a polyamide resin, to make a pigmented resin layer of a laser-markable laminate. However, most of known heat resistant resins are hard and brittle. For use as a label to be attached to a curved surface of, e.g., a car body, a motorcycle body, or a machine part, such a resin layer has insufficient flexibility, and the label can have its peripheral portion lifted.

The inventors of the present invention proposed in patent document 3 (see below) a laser-markable laminate comprising a pigmented resin layer, a pigmented destructible layer made of a crosslinked acrylic resin and containing a glycol compound, and an adhesive layer. The laminate is attachable to a curved surface and is tamper-proof because of brittleness. The problem with this laminate is that the laser-marked laminate (label) has poor workability in attachment to a substrate due to its softness (lack of moderate stiffness).

Patent document 1: JP 09-123606A
Patent document 2: JP 09-123607A
Patent document 3: JP 2007-021818A

DISCLOSURE OF THE INVENTION

An object of the invention is to provide a laminate that is laser-markable to create a clearly visible image, does not suffer from appearance defects, such as a crack, even when exposed to severe temperature conditions as in a desert or tropic region, and has good workability in attachment.

Another object of the invention is to provide a laser-markable laminate that does not suffer from appearance defects, such as a crack, even when subjected to a severer temperature condition, particularly at 150° C. or even higher, and has good workability in attachment.

The inventors have found that a laser-markable laminate having endurance under high temperature conditions and good attachment workability is obtained by using a crosslinked acrylic resin and balancing thickness and tensile elongation at break of each layer thereby to improve attachment workability. The invention has been reached based on these findings.

The inventors have also found that a laser-markable laminate having endurance not to suffer from appearance defects, such as a crack, even under a high temperature condition of 150° C. or higher and good attachment workability is obtained by using, as a coloring material, a reactive hydroxyl group-containing acrylic resin having a pigment dispersed therein and providing a structure composed of three layers each made of a crosslinked acrylic resin composition having a specific hydroxyl value. The invention has been reached based on these findings.

The invention provides in its first aspect a laser-markable, acrylic resin-based laminate including the following resin layers (A1), (B1), and (C1) and having a thickness of 100 to 200 μm.

(A1) A pigmented layer having a thickness of 10 to 30 μm, being made of an acrylic resin, having a tensile elongation at break of less than 5%, and providing the outermost surface when the laminate is attached to a substrate.

(B1) A base layer laminated with the pigmented layer, having a thickness of 30 to 60 μm, providing a visibly distinguishable color difference from the pigmented layer (A1), being made of an acrylic resin, and having a tensile elongation at break of 15% or more.

(C1) A destructible layer laminated with the base layer (B), having a thickness of 20 to 150 μm; being made of an acrylic resin, and having a tensile elongation at break of less than 10%.

The invention provides in its second aspect a laser-markable, acrylic resin-based laminate including the following resin layers (A2), (B2), and (C2) and having a thickness of 100 to 200 μm.

(A2) A pigmented layer having a thickness of 10 to 30 μm, being made of an acrylic resin, having a tensile elongation at break of less than 5%, and providing the outermost surface of the laminate when attached to a substrate.

(B2) A destructible layer laminated with the pigmented layer, having a thickness of 30 to 150 μm, providing a visibly distinguishable color difference from the pigmented layer (A2), being made of an acrylic resin, and having a tensile elongation at break of less than 8%.

(C2) A base layer laminated with the destructible layer (B2), having, a thickness of 40 to 80 μm, being made of an acrylic resin, and having a tensile elongation at break of 12% or more.

The invention provides in its third aspect a laser-markable, acrylic resin-based laminate including the following resin layers (A3), (B3), and (C3) and having a thickness of 100 to 200 μm.

(A3) A pigmented layer being made of a crosslinked acrylic resin obtained by crosslinking an acrylic resin composition with a melamine crosslinking agent and providing the outermost surface of the laminate when attached to a substrate, the acrylic resin composition having a hydroxyl value of 10 to 100 mg KOH/g and containing (A3-1) an acrylic polymer having a reactive functional group, (A3-2) cellulose acetate butyrate, and (A3-3) a pigment.

(B3) A base layer laminated with the pigmented layer (A3) being made of a crosslinked acrylic resin obtained by crosslinking an acrylic resin composition with an isocyanate crosslinking agent and providing a visibly distinguishable color difference from the pigmented layer (A3), the acrylic resin composition having a hydroxyl value of 5 to 30 mg KOH/g or 18 to 40 mg KOH/g and containing (B3-1) an acrylic polymer having a reactive functional group, (B3-2) a glycol compound, and (B3-3) a coloring material containing an acrylic resin having a reactive hydroxyl group and a pigment dispersed in the acrylic resin.

(C3) A destructible layer laminated with the base layer (B3), being made of a crosslinked acrylic resin obtained by crosslinking a mixture of an acrylic resin composition and polymer beads with an isocyanate crosslinking agent, the acrylic resin composition having a hydroxyl value of 3 to 20 mg KOH/g or 20 to 35 mg KOH/g and containing (C3-1) an acrylic polymer having a reactive functional group, (C3-2) a glycol compound, and (C3-3) a coloring material containing an acrylic resin having a reactive hydroxyl group and a pigment dispersed in the acrylic resin.

The laminate of each of the first and second aspects of the invention is adapted to be irradiated with laser light to have the pigmented layer ablated in a desired pattern thereby to visualize the color of the base layer in the ablated portion. The laminate is thus capable of imaging any desired letters or figures.

The laminate of the third aspect of the invention is usable even under high temperature conditions of 150° C. or higher. When it is imagewise irradiated with laser light, the pigmented layer is ablated to visualize the color of the base layer in the irradiated portion. The laminate is thus capable of imaging any desired letters or figures.

BRIEF DESCRIPTION OF DRAWING

FIG. 1-2 is a cross-section of a laser-markable brittle laminate according to the first aspect of the invention which contains beads in its destructible layer.

FIG. 2-1 is a cross-section of a laser-markable brittle laminate typifying the second aspect of the invention.

FIG. 2-2 is a cross-section of a laser-markable brittle laminate according to the second aspect of the invention which contains beads in its destructible layer.

BEST MODE FOR CARRYING OUT THE INVENTION

Figure 1:
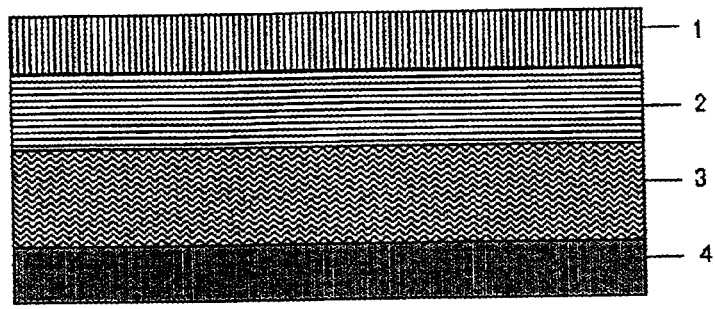
FIG. 1-1 is a cross-section of a laser-markable brittle laminate typifying the first aspect of the invention.

The laser-markable, acrylic resin-based laminate of the present invention will be described in detail with reference to its preferred embodiments.

The laminate of any aspect of the invention has differently colored layers including a pigmented layer having laser light absorptivity and a base layer or a destructible layer. The differently colored layers are designed such that, when imagewise (for example, in a pattern of characters) irradiated with a focused laser beam with a controlled output, the irradiated part of the pigmented layer is removed through heat generation, followed by melting, and followed by atomization or through heat generation, followed by decomposition, and followed by ashing whereby the color of the base layer or the destructible layer is exposed to vision.

The laminate of the first aspect of the invention will be described first. The laminate of the first aspect has a pigmented layer (A1) on the surface thereof. The pigmented layer (A1) is removable on irradiation with laser light. The pigmented layer (A1) is made of a pigmented resin that is an acrylic resin having a pigment added thereto and provided by a known method with a prescribed thickness to adjoin a base layer (B1).

The acrylic resin that makes the pigmented layer (A1) is preferably a crosslinked acrylic resin crosslinked with an amino resin crosslinking agent. As used herein, the term "crosslinked acrylic resin" means an acrylic resin having a functional group crosslinked by using, e.g., a crosslinking agent. As used herein, the term "acrylic resin" refers to a resin consisting mainly of a resin obtained by polymerizing an acrylic monomer or a methacrylic monomer. The phrase "consist mainly of" as used herein is intended to mean that the content of the acrylic resin in the total resinous component is at least 50%.

Examples of the acrylic monomers include acrylic esters, such as methyl acrylate, propyl acrylate, butyl acrylate, 2-hydroxyethyl acrylate, and 2-ethylhexyl acrylate. Examples of the methacrylic monomers include methyl methacrylate, ethyl methacrylate, propyl methacrylate, butyl methacrylate, and ethylene glycol dimethacrylate. Examples of the functional group include a hydroxyl group, a mercapto group, an epoxy group, an amide group, and a methylolated acrylamide group.

Preferred acrylic resins are copolymers obtained from a monomer having a hydroxyl group as a functional group in view of pot life after mixing with a crosslinking agent and controllability of tensile elongation at break after crosslinking. Copolymers obtained from methyl methacrylate (MMA) is also suitable in view of the hardness after crosslinking.

An amino resin crosslinking agent is used as the crosslinking agent of the pigmented layer (A1). Examples of the amino resin crosslinking agent include a melamine crosslinking agent, a guanamine crosslinking agent, and a urea crosslinking agent. The melamine crosslinking agent is preferred in terms of controlling physical properties, such as heat resistance and tensile elongation at break after crosslinking.

The crosslinking agent is used in an amount of 0.5 to 1.5 equivalent weights, preferably 0.8 to 1.2 equivalent weights, per equivalent weight of the reactive functional group of the acrylic resin.

The pigmented layer (A1) has a thickness of 10 to 30 μm, preferably 10 to 20 μm. A thickness of 10 μm or more assures sufficient hiding properties. A thickness less than 30 μm assures complete removal of the irradiated part on laser light irradiation.

It is recommended for the pigmented layer (A1) to have a pigment content of 1% to 300%, preferably 5% to 250%, more preferably 8% to 200%, by weight. When the pigment content is less than 1 wt %, the pigmented layer (A1) generally has low hiding ability only to provide a small contrast to the background color. With a pigment content of 300 wt % or more, the pigmented layer would be too brittle and can form a crack when the laminate is attached to a curved surface.

The pigments that can be used in the pigmented layer (A1) and a base layer (B1) and a destructible layer (C1) hereinafter described are not particularly limited but are preferably those having weatherability and endurance during long use as well as removability by irradiation with laser light. Specifically, suitable pigments may be chosen from those described in *Colour Index 3rd Edition*, The Society of Dears and Colourist (1971) and its *Supplements* (1975). The pigment names hereinafter recited are in accordance with ibid, "Colour Index Generic Name". For instance, Bk-1 denotes C.I. Pigment Black 1; Bk represents black; and W represents white.

While the pigments may have any color, including yellow, orange, red, purple, blue, green, brown, black, or white, a black and a white pigment are usually used. Preferred pigments are described below.

The black pigments may be organic or inorganic. Examples of preferred organic black pigments include aniline black (Bk-1) and perylene black (Bk-31).

Examples of preferred inorganic black pigments include carbon black (Bk-31), carbon black (Bk-7), carbon black (Bk-9), iron black (Bk-11), and cobalt oxide pigment (Bk-13).

Preferred of these pigments are amorphous or graphite carbon black (black). Carbon black pigments preferably have an average particle size of 10 to 500 nm, more preferably 15 to 120 nm. Various commercially available carbon black products with small average particle sizes are usable.

The white pigments are preferably inorganic ones, such as zinc white (W-4), zinc sulfide (W-7), titanium dioxide (W-6), calcium carbonate (W-18), clay (W-19), barium sulfate (W-21), alumina white (W-24), silica (W-27), muscovite (W-20), and talc (W-26).

Preferred of the pigments is rutile titanium oxide (white). Titanium oxide to be used preferably has an average particle size of 10 to 500 nm, more preferably 20 to 100 nm. Various commercially available titanium oxide products with small average particle sizes are usable.

The pigmented layer (A1) may contain mica or aluminum powder in addition to the pigment in an amount that does not affect the pigmentation and weatherability of the layer.

Carbon black or titanium oxide used as a pigment in the pigmented layer (A1) is capable of converting laser light to heat. In the case of using a pigment that does not absorb laser light, a compound capable of converting laser light to heat is needed in some cases. In such cases, two or more pigments may be used in combination, or one or more than one pigment may be used in combination with at least one compound capable of converting laser light to heat.

Examples of the compound capable of converting laser light to heat include carbon black and cyanine, phthalocyanine or inorganic infrared absorbers.

The laminate of the first aspect of the invention further includes a base layer (B1) laminated with the pigmented layer (A1). The base layer (B1) is made of a crosslinked acrylic resin and provides a visibly distinguishable color difference from the pigmented layer (A1). The base layer (B1) is preferably made of a crosslinked acrylic resin. While the acrylic resin making the base layer (B1) is chosen from the same materials usable to make the pigmented layer (A1), the base layer (B1) is different from the pigmented layer (A1) in kind of crosslinking agent or additive so as to have flexibility represented by a tensile elongation at break of 15% or more.

The crosslinking agent used to crosslink the acrylic resin of the base layer (B1) is preferably an isocyanate crosslinking agent, particularly an aliphatic or alicyclic isocyanate crosslinking agent, in view of flexibility after crosslinking. Examples of the aliphatic or alicyclic isocyanate crosslinking agent include trans-cyclohexane 1,4-diisocyanate, pentamethylene diisocyanate, hexamethylene diisocyanate, heptamethylene diisocyanate, 4,4'-dicyclohexylbutane diisocyanate, lysine diisocyanate, isophorone diisocyanate, lysine ester triisocyanate, 1,6,11-undecatriisocyanate, 1,8-diisocyanate 4-isocyanate methyloctane, 1,3,6-hexamethylene triisocyanate, bicycloheptane triisocyanate, and trimethylhexamethylene diisocyanate.

The crosslinking agent is used in an amount of 0.1 to 1.3 equivalent weights, preferably 0.2 to 1.0 equivalent weight, per equivalent weight of the functional group of the resin making the base layer (B1). Too large an amount of the crosslinking agent results in reduced flexibility. Too small an amount of the crosslinking agent results in reduced heat resistance and durability.

The base layer (B1) has a color visibly distinguishable from the pigmented layer (A1). The pigments to be used in the base layer (B1) may be selected from those useful in the pigmented layer (A1). A recommended pigment content in the base layer (B1) is 10% to 500%, preferably 30% to 300%, more preferably 40% to 250%, by weight. A pigment content less than 10 wt % is unable to assure hiding properties. A pigment content of 500 wt % or more results in a failure to maintain a film form.

The base layer (B1) may contain a glycol compound as a flexibility imparting agent to retain the flexibility. The term "glycol compound" as used herein is intended to mean a condensation product of a diol. Examples of the glycol compound include ethylene glycol, propylene glycol, 1,4-butanediol, diethylene glycol, and glycol polymers, such as polyethylene glycol, poly(tetramethyl glycol), and a THF-neopentyl glycol copolymer. The glycol polymers are preferred in terms of volatility, performance of imparting flexibility per unit amount of addition, and water resistance. Poly(tetramethyl glycol) is particularly preferred in terms of versatility and cost.

The glycol compound may be used in an amount of 1% to 10%, preferably 2% to 8%, more preferably 3% to 6%, by weight based on the resin composition. With a glycol compound content of 1 wt % or less, the film can form a crack on bending in attachment. With a glycol compound content of 10 wt % or more, the laminate (e.g., a label) once attached is able to be stripped off without breakage.

The base layer (B1) has a thickness of 30 to 60 μm, preferably 40 to 50 μm.

The laminate of the first aspect further includes a destructible layer (C1) that is made of an acrylic resin and laminated with the base layer (B1). The destructible layer (C1) is preferably made of a crosslinked acrylic resin. The acrylic resin may be chosen from those usable to make the pigmented layer (A1). The destructible layer (C1) is formed of a resin rendered friable or brittle by crosslinking or addition of a brittleness-imparting component described hereunder. The destructible layer (C1) should have a tensile elongation at break of less than 10%.

Examples of the crosslinking agent usable to crosslink the acrylic resin of the destructible layer (C1) include melamine crosslinking agents, isocyanate crosslinking agents, epoxy crosslinking agents, polyamine crosslinking agents, and aldehyde crosslinking agents. It is preferred to use a melamine crosslinking agent or an isocyanate crosslinking agent within a range that satisfies the aforementioned requirement of tensile elongation at break, with controlling physical properties, such as heat resistance and hardness after crosslinking, taken into consideration.

The melamine crosslinking agent usable in the pigmented layer (A1) or the isocyanate crosslinking agent usable in the base layer (B1) may appropriately be used in the destructible layer (C1) in a range such that the above recited requirement of tensile elongation at break may be satisfied:

The crosslinking agent is used in an amount of 0.1 to 1.5 equivalent weights, preferably 0.2 to 1.3 equivalent weights, more preferably 0.3 to 1.2 equivalent weights, per equivalent weight of the functional group of the resin of the destructible layer (C1). Using too much crosslinking agent makes the layer too brittle, which may impair the workability of the laminate. Too low an amount of the crosslinking agent makes the layer hardly destructible.

It is preferred for the destructible layer (C1) to contain a brittleness imparting component. Examples of useful brittleness imparting component include inorganic particles, such as glass beads, silica particles, and calcium carbonate particles, and organic particles, such as acrylic beads, styrene beads, and silicone beads. Preferred of them are glass beads, acrylic beads, styrene beads, and silicone beads in terms of reachable narrowness of particle size distribution. Glass beads and acrylic beads are more preferred.

The organic or inorganic particles that are added as a brittleness imparting component must have an average particle size not greater than the thickness of the destructible layer. The average particle size of the brittleness imparting component ranges from 1 to 150 µm, preferably 5 to 100 µm, more preferably 10 to 80 µm. With the particle size of 1 µm or less, brittleness is not imparted. With the particle size of 150 µm or more, the layer easily forms a crack in the attachment operation.

The content of the brittleness imparting component is 10% to 280%, preferably 10% to 200%, more preferably 30% to 100%, by volume based on the resin of the destructible layer (C1). Addition of 10% or less by volume of the brittleness imparting component produces no effect. Addition of 280% or more by volume of the brittleness imparting component results in void formation between the particles, which can cause cracking during attachment.

The destructible layer (C1) may be colored and may be transparent. Where colored, the destructible layer (C1) is colored preferably in the same hue as the base layer (B1). The same pigments (colorant) usable in the pigmented layer (A1) may be used. The recommended pigment content in the destructible layer (C1) is 10% to 500%, preferably 30% to 300%, more preferably 50% to 250%, by weight. A pigment content of less than 10 wt % is unable to assure hiding properties. A pigment content of 500 wt % or more results in a failure to maintain a film form.

The laminate of the first aspect is required to have a tensile elongation at break of 5% to 30% measured in accordance with JIS K7127. The tensile elongation at break is preferably 10% to 25%. A tensile elongation at break of at least 5% assures workability. A tensile elongation at break of less than 30% secures non-reusability of the label.

The laminate of the first aspect has a tensile strength of at least 20 N/10 mm, preferably 25 N/10 mm or more, measured in accordance with JIS K7127. A label formed of the laminate with a tensile strength of less than 20 N/10 mm has poor workability in attachment due to lack of stiffness.

When a label having the laminate of the first aspect is attached to a substrate and peeled off by the hand or with a tool, the film is destroyed. Destruction occurs through various mechanisms. In frequent cases, the pigmented layer (A1) with a small tensile breaking strength unrecoverably undergoes cracking due to the strain caused by the stress accompanying peeling. Known brittle laminates designed to be destroyed when peeled are so hard and brittle that they have poor workability or poor conformability to the contour of a substrate when attached as a label. In contrast, the laminate of the first aspect exhibits both workability and destructibility because a resin layer with a large tensile breaking strength is provided as the base layer (B1) and the three layers have respectively selected thicknesses.

The laminate of the first aspect may further include an adhesive layer with which it is attached to a substrate. The adhesive layer has a thickness of 15 to 100 µm, preferably 20 to 70 µm, more preferably 25 to 45 µm. A thickness of 15 µm or more assures sufficient adhesion to a substrate. A thickness of less than 100 µm is suitable for the attachment and economically advantageous.

The resin making the adhesive layer is not limited. However, an acrylic adhesive is preferably used in view of weatherability, transparency, and anti-yellowing properties. If desired, the acrylic resin adhesive may contain additives, such as a tackifier, a UV absorber, a photo stabilizer, and an antioxidant.

The laminate of the first aspect is prepared by coating, or printing (e.g. gravure printing) a pigmented layer-forming resin having a pigment dispersed therein to a carrier film, drying the resin applied to form a pigmented layer (A1), coating, or printing (e.g., gravure printing) a base layer-forming resin having a pigment dispersed therein to the pigmented layer (A1), drying the resin applied to form a base layer (B1), coating, or printing (e.g., gravure printing) a destructible layer-forming resin having a pigment dispersed therein to the base layer (B1), and drying the resin applied to form a destructible layer (C1). The laminate may be otherwise prepared using known methods for producing a laminate film, for example a method including forming pigmented dry films corresponding to the layers (A1), (B1), and (C1) and laminating the dry films by thermopress bonding or with an adhesive or a combination of these methods.

Figures 1, 2:
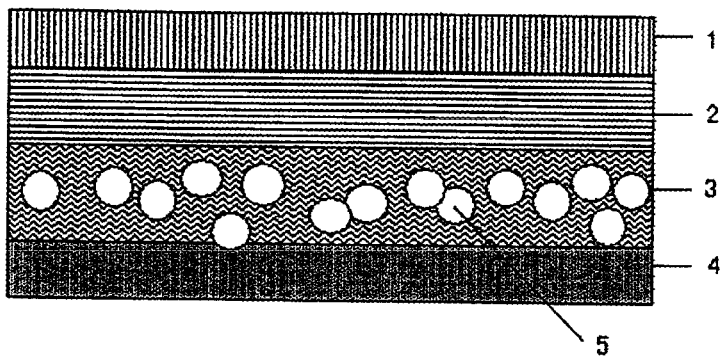
Figures 1, 2:
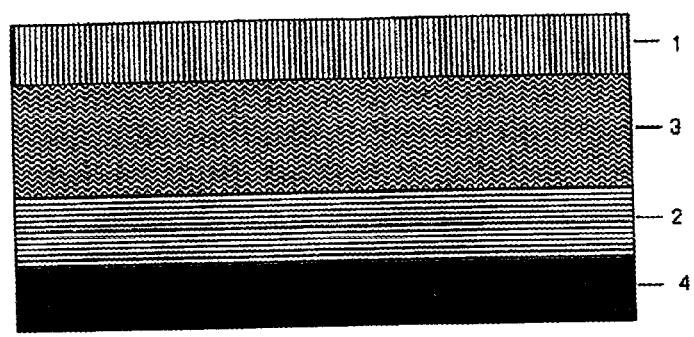
Figure 2:
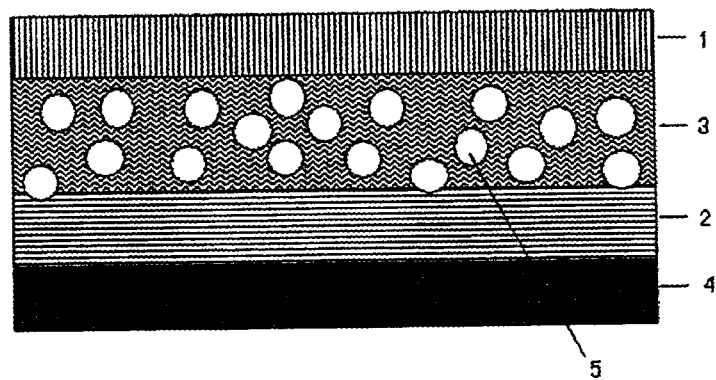

As illustrated in FIG. 1-1, the laminate of the first aspect includes an adhesive layer 4, (C1) a destructible layer 3 that is destroyed on peeling the laminate, (B1) a base layer 2, and (A1) a pigmented layer 1 that is destroyed on peeling the laminate and ablated on irradiation with laser light, being stacked one on top of another in the order named. On imagewise irradiating the laminate with laser light, the (A1) pigmented layer 1 and part of the (B1) base layer 2 are removed in the pattern of laser irradiation to expose the (B1) base layer 2. As a result, a desired image appears on the laminate as a color contrast between the (A1) pigmented layer 1 and the (B1) base layer 2. The (C1) destructible layer may contain beads 5 as a brittleness imparting component, which embodiment is illustrated in FIG. 1-2.

Lasers used for irradiation include $CO_2$ lasers, Nd:YAG lasers, excimer lasers, semiconductor lasers, semiconductor excited solid state lasers, Ar lasers, $N_2$/dye lasers, and HeCd lasers. $CO_2$ lasers, Nd:YAG lasers, and so on that are inexpensive and relatively easy to operate are generally used.

The laminate according to the second aspect of the invention will then be described. The description of the first aspect applies to the second aspect with the exceptions noted hereafter.

The laminate of the second aspect has a pigmented layer (A2) on the surface thereof. The pigmented layer (A2) is removable on irradiation with laser light. The pigmented layer (A2) is made of a pigmented resin that is an acrylic resin having a pigment added thereto and provided with a prescribed thickness by a known method to adjoin a destructible layer (B2).

The acrylic resin that can be used to make the pigmented layer (A2) is preferably a crosslinked acrylic resin crosslinked with an amino resin crosslinking agent similarly to the pigmented layer (A1) of the laminate of the first aspect. As used herein, the term "acrylic resin" means a resin consisting mainly of a resin obtained by polymerizing an acrylic monomer or a methacrylic monomer. The phrase "consist mainly of" as used herein is intended to mean that the content of the acrylic resin in the total resinous component is at least 50%.

Examples of the acrylic monomer, the methacrylic monomer, and the reactive functional group include those recited above with respect to the pigmented layer (A1) of the first aspect.

Preferred resins are copolymers obtained from a monomer having a hydroxyl group as a functional group in view of pot life after mixing with a crosslinking agent and controllability of tensile elongation at break after crosslinking. Copolymers obtained from methyl methacrylate (MMA) is also suitable in view of the hardness after crosslinking.

Similarly to the pigmented layer (A1) of the laminate of the first aspect, an amino resin crosslinking agent is used as the crosslinking agent of the pigmented layer (A2). Examples of the amino resin crosslinking agent include a melamine crosslinking agent, a guanamine crosslinking agent, and a urea crosslinking agent. The melamine crosslinking agent is preferred in terms of controlling physical properties, such as heat resistance and tensile elongation at break after crosslinking.

The crosslinking agent is used in an amount of 0.5 to 1.5 equivalent weights, preferably 0.8 to 1.2 equivalent weights, per equivalent weight of the reactive functional group of the resin.

The thickness of the pigmented layer (A2) is 10 to 30 µm, preferably 10 to 20 µm, similarly to the pigmented layer (A1) of the first aspect. With a thickness of 10 µm or more, sufficient hiding properties are obtained. A thickness of less than 30 µm assures complete removal of the irradiated part on irradiation with a laser beam.

It is recommended for the pigmented layer (A2) to have a pigment content of 1% to 300%, preferably 5% to 250%, more preferably 8% to 200%, by weight. When the pigment content is less than 1 wt %, the pigmented layer (A2) generally has low hiding ability only to provide a small contrast to the background color. With a pigment content of 300 wt % or more, the pigmented layer would be too brittle and can form a crack when the laminate is attached to a curved surface.

Similarly to the pigmented layer (A1) of the first aspect, the pigments that can be used in the pigmented layer (A2) and a base layer (C2) and a destructible layer (B2) hereinafter described are preferably those having weatherability and endurance during long use as well as removability by irradiation with laser light. Specifically, suitable pigments may be chosen from those described in Colour Index 3rd Edition, The Society of Dears and Colourist (1971) and its Supplements (1975). The pigment names hereinafter recited are in accordance with ibid. "Colour Index Generic Name". For instance, Bk-1 denotes C.I. Pigment Black 1; Bk represents black; and W represents white.

Similarly to the pigmented layer (A1) of the first aspect, while the pigments may have any color, including yellow, orange, red, purple, blue, green, brown, black, or white, black and white pigments are usually used. Preferred pigments are described below.

Preferred black pigments for use in the second aspect are the same as those recited above with respect to the pigmented layer (A1) of the first aspect.

Preferred white pigments for use in the second aspect are the same as those recited above with respect to the pigmented layer (A1) of the first aspect.

Similarly to the pigmented layer (A1) of the first aspect, preferred of the pigments is rutile titanium oxide (white). Titanium oxide to be used preferably has an average particle size of 10 to 500 nm, more preferably 20 to 100 nm. Various commercially available titanium oxide products with small average particle sizes are usable.

The pigmented layer (A2) may contain mica or aluminum powder in addition to the pigment in an amount that does not affect the pigmentation and weatherability of the layer.

Carbon black or titanium oxide used as a pigment in the pigmented layer (A2) is capable of converting laser light to heat. In the case of using a pigment that does not absorb laser light, a compound capable of converting laser light to heat is needed in some cases. In such cases, two or more pigments may be used in combination, or one or more than one pigment may be used in combination with at least one compound capable of converting laser light to heat.

Examples of the compound capable of converting laser light to heat include carbon black and cyanine, phthalocyanine or inorganic infrared absorbers.

The laminate of the second aspect further includes a destructible layer (B2) that is made of an acrylic resin and laminated with the pigmented layer (A2). The destructible layer (B2) is preferably made of a crosslinked acrylic resin. The acrylic resin is chosen from the same materials usable to make the pigmented layer (A2). It is necessary that the destructible layer (B2) be made of a resin endowed with brittleness by crosslinking or addition of a brittleness imparting component hereinafter described and have a tensile elongation at break of less than 8%.

Examples of the crosslinking agent usable to crosslink the acrylic resin of the destructible layer (B2) include those described with respect to the destructible layer (C1) of the first aspect, i.e., melamine crosslinking agents, isocyanate crosslinking agents, epoxy crosslinking agents, polyamine crosslinking agents, and aldehyde crosslinking agents. It is preferred to use a melamine crosslinking agent or an isocyanate crosslinking agent within a range that satisfies the aforementioned requirement of tensile elongation at break, with physical properties, such as heat resistance and hardness after crosslinking, taken into consideration.

The melamine crosslinking agent usable in the pigmented layer (A2) and an isocyanate crosslinking agent usable in a base layer (C2) hereinafter described may be used appropriately in the destructible layer (B2) in a range such that the above recited requirement of tensile elongation at break may be satisfied.

The crosslinking agent is used in an amount of 0.1 to 1.5 equivalent weights, preferably 0.2 to 1.3 equivalent weights, more preferably 0.3 to 1.2 equivalent weights, per equivalent weight of the functional group of the resin of the destructible layer (B2) similarly to the destructible layer (C1) of the first aspect. Using too much crosslinking agent makes the layer too brittle, which may impair the workability of the laminate. Too low an amount of the crosslinking agent makes the layer hardly destructible.

The destructible layer (B2) may contain a brittleness imparting component. Examples of useful brittleness imparting components are the same as those recited above with respect to the destructive layer (C1) of the first aspect.

The organic or inorganic particles that may be added as a brittleness imparting component must have an average particle size not greater than the thickness of the destructible layer similarly to the destructible layer (C1) of the first aspect. The average particle size of the brittleness imparting component ranges from 1 to 150 μm, preferably 5 to 100 μm, more preferably 10 to 80 μm. With the particle size being 1 μm or less, brittleness is not imparted. With the particle size of 150 μm or more, the layer easily forms a crack in the attachment operation.

Similarly to the destructible layer (C1) of the first aspect, the content of the brittleness imparting component is 10% to 280%, preferably 10% to 200%, more preferably 30% to 100%, by volume based on the resin of the destructible layer (B2). Addition of 10% or less by volume of the brittleness imparting component produces no effect. Addition of 280% or more by volume of the brittleness imparting component results in void formation between the particles, which can cause cracking during attachment.

The destructible layer (B2) should be pigmented so as to provide a visually distinguishable color difference from the pigmented layer (A2). Pigmentation of the destructible layer (B2) may be achieved using any of the pigments (colorants) usable in the pigmented layer (A2). Similarly to the destructible layer (C1) of the first aspect, the recommended pigment content in the destructible layer (B2) is 10% to 500%, preferably 30% to 300%, more preferably 50% to 250%, by weight. A pigment content of less than 10 wt % is unable to assure hiding properties. A pigment content of 500 wt % or more results in a failure to maintain a film form.

The laminate of the second aspect further includes a base layer (C2) made of an acrylic resin and laminated with the destructible layer (B2). The base layer (C2) may be colored and may be transparent. Where colored, the base layer (C2) is colored preferably in the same hue as the destructible layer (B2). The same pigments usable in the pigmented layer (A2) may be used. While the acrylic resin making the base layer (C2) may be selected from the resins usable in the pigmented layer (A2), the base layer (C2) is different from the pigmented layer (A2) in kind of crosslinking agent or additive so as to have flexibility represented by a tensile elongation at break of 12% or more.

Similarly to the pigmented layer (B1) of the first aspect, the crosslinking agent used to crosslink the acrylic resin of the base layer (C2) is preferably an isocyanate crosslinking agent, particularly an aliphatic or alicyclic isocyanate crosslinking agent, in view of flexibility after crosslinking. Examples of the aliphatic or alicyclic isocyanate crosslinking agent include those enumerated above with respect to the base layer (B1) of the first aspect of the invention.

Similarly to the base layer (B1) of the first aspect, the crosslinking agent is used in an amount of 0.1 to 1.3 equivalent weights, preferably 0.2 to 1.0 equivalent weight, per equivalent weight of the functional group of the resin making the destructible layer (B2). Too large an amount of the crosslinking agent results in reduced flexibility. Too small an amount of the crosslinking agent results in reduced heat resistance and durability.

The base layer (C2) may be colored and may be transparent. Where colored, the base layer (C2) is colored preferably in the same hue as the destructible layer (B2). The same pigments usable in the pigmented layer (A2) may be used. Similarly to the base layer (B1) of the first aspect, a recommended pigment content in the base layer (C2) is 10% to 500%, preferably 30% to 300%, more preferably 50% to 250%, by weight. A pigment content of less than 10 wt % is unable to assure hiding properties. A pigment content of 500 wt % or more results in a failure to maintain a film form.

The base layer (C2) may contain the same glycol compound as usable in the base layer (B1) of the first aspect as a flexibility imparting agent to retain the flexibility. Examples of the glycol compound include those enumerated above with respect to the base layer (B1) of the first aspect. The glycol polymers are preferred in terms of volatility, performance of imparting flexibility per unit amount of addition, and water resistance. Poly(tetramethyl glycol) is particularly preferred in terms of versatility and cost.

Similarly to the base layer (B1) of the first aspect, the glycol compound may be used in an amount of 1% to 10%, preferably 2% to 8%, more preferably 3% to 6%, by weight based on the resin composition. With a glycol compound content of 1 wt % or less, the film can form a crack on bending in attachment. With a glycol compound content of more than 10 wt % or more, the laminate once attached may be peeled off without damage.

The base layer (C2) has a thickness of 40 to 80 μm, preferably 50 to 60 μm. The base layer (C2) with a thickness of at least 40 mμ provides the laminate with sufficient flexibility. With a thickness of less than 80 μm, the base layer (C2) exhibits destructibility.

The laminate of the second aspect should have a tensile elongation at break of 5% to 30% measured in accordance with JIS K7127. The tensile elongation at break is preferably 10% to 25%. A tensile elongation at break of at least 5% assures workability. A tensile elongation at break of less than 30% secures non-reusability.

The laminate of the second aspect has a tensile strength of at least 25 N/10 mm, preferably 30 N/10 mm or more, measured in accordance with JIS K7127. A label formed of the laminate with a tensile strength of less than 25 N/10 mm has poor workability in attachment due to lack of stiffness.

Similarly to the label having the laminate of the first aspect, when a label having the laminate of the second aspect attached to a substrate and peeled off by the hand or with a tool, the film is destroyed. Destruction occurs through various mechanisms. In frequent cases, the pigmented layer (A2) with a small tensile breaking strength unrecoverably undergoes cracking on peeling. Known brittle laminates designed to be destroyed when peeled are so hard and brittle that they have poor workability or poor conformability to the contour of a substrate when attached to a substrate as a label. In contrast, the laminate of the invention exhibits both workability and destructibility because a resin layer with a large tensile breaking, strength is provided as the base layer (C2) and the three layers have respectively selected thicknesses.

Similarly to the laminate of the first aspect, the laminate of the second aspect may further include an adhesive layer with which it is attached to a substrate. Similarly to the adhesive layer of the laminate according to the first aspect, the adhesive layer has a thickness of 15 to 100 µm, preferably 20 to 70 µm, more preferably 25 to 45 µm. With a thickness of 15 µm or more, the laminate attached to a substrate comes off, which provides the substrate with good processability in, for example, bending. A thickness of less than 100 µm is suitable for the attachment and economically advantageous.

Similarly to the adhesive layer of the laminate of the first aspect, the adhesive layer is preferably made of an acrylic adhesive in view of weatherability, transparency, and anti-yellowing properties. If desired, the acrylic adhesive may contain additives, such as a tackifier, a UV absorber, a photo stabilizer, and an antioxidant.

The laminate of the second aspect is prepared by coating, or printing (e.g., gravure printing) a pigmented layer-forming resin having a pigment dispersed therein to a carrier film, drying the resin applied to form a pigmented layer (A2), coating, or printing, (e.g. gravure printing) a destructible layer-forming resin to the pigmented layer (A2), drying the resin applied to form a destructible layer (B2), coating, or printing (e.g., gravure printing) a base layer-forming resin having a pigment dispersed therein to the destructible layer (B2), and drying the resin applied to form a base layer (C2). The laminate may be otherwise prepared using known methods for producing a laminate film, for example a method including forming pigmented dry films corresponding to the layers and laminating the dry films by thermopress bonding or with an adhesive or a combination of these methods.

As illustrated in FIG. 2-1, the laminate of the second aspect includes an adhesive layer 4, (C2) a base layer 2, (B2) a destructible layer 3 that is destroyed on peeling the laminate, and (A2) a pigmented layer 1 that is laser ablatable, being stacked one on top of another in the order named. On image-wise irradiating the laminate with laser light, the (A2) pigmented layer 1 is ablated in the pattern of laser irradiation to expose the (B2) destructible layer 3. As a result, a desired image appears on the laminate as a color contrast between the (A2) pigmented layer 1 and the (B2) destructible layer 3. The (B2) destructible layer 3 may contain beads 5 as a brittleness imparting component, which embodiment is illustrated in FIG. 2-2.

Examples of lasers used for laser ablation include those listed above with respect to the first aspect. $CO_2$ lasers, Nd:YAG lasers, and so on that are inexpensive and relatively easy to operate are generally used.

The laminate according to the third aspect of the invention will now be described. The description of the first and second aspects applies to the third aspect with the exceptions noted hereafter.

The laminate of the third aspect has a pigmented layer (A3) on the surface thereof. The pigmented layer (A3) is ablatable on irradiation with laser light. The pigmented layer (A3) is made of a pigmented resin that is an acrylic resin having a pigment added thereto and provided with a prescribed thickness by lamination or coating in a known manner to adjoin a base layer (B3).

The resin that can be used to make the pigmented layer (A3) is a crosslinked acrylic resin obtained by crosslinking an acrylic resin composition with a melamine crosslinking agent. The acrylic resin composition contains (A3-1) an acrylic polymer having a reactive functional group, (A3-2) cellulose acetate butyrate (CAB), and (A3-3) a pigment.

As used herein, the term "acrylic polymer having a reactive functional group" means a resin consisting mainly of a resin obtained by polymerizing an acrylic monomer or a methacrylic monomer. The term "reactive functional group" means a functional group reactive with a crosslinking aunt, such as a hydroxyl group or a carboxyl group. The phrase "consist mainly of" as used herein is intended to mean that the content of the acrylic resin in the total resinous component is at least 50%.

Examples of the acrylic monomer, the methacrylic monomer, and the reactive functional group include those recited above with respect to the pigmented layer (A1) of the laminate of the first aspect.

Of the resin recited, preferred are copolymers obtained from a monomer having a hydroxyl group as a reactive functional group, such as 2-hydroxyethyl acrylate, in view of pot life after mixing with a crosslinking agent and controllability of tensile elongation at break after crosslinking.

The pigmented layer (A3) contains cellulose acetate butyrate (CAB) to assure processability and control the brittleness of the pigmented layer (A3). The amount of CAB is 0.5% to 10%, preferably 1% to 8%, by weight.

The pigmented layer (A3) contains 1% to 10% by weight, preferably 2% to 8% by weight, of a pigment (colorant). When the pigment content is less than 1 wt %, the pigmented layer generally has low hiding ability only to provide a small contrast to the background color. With a pigment content of 10 wt % or more, the pigmented layer (A3) would be too brittle and can form a crack when the laminate is attached to a curved surface.

Similarly to the pigmented layer (A1) of the first aspect, the pigments (colorants) that can be used in the pigmented layer (A3) and a base layer (B3) and a destructible layer (C3) hereinafter described are preferably those having weatherability and endurance during lone use as well as removability by irradiation with laser light.

Similarly to the first aspect, while the pigments may have any color, including yellow, orange, red, purple, blue, green, brown, black, or white, black pigments and white pigments are usually used. Preferred pigments are described below.

Preferred black pigments for use in the third aspect are the same as those recited above as preferred black pigments for use in the pigmented layer (A) of the first aspect.

Similarly to the pigmented layer (A1) of the first aspect, preferred of the black pigments are amorphous or graphite carbon black (black). Carbon black pigments preferably have an average particle size of 10 to 500 nm, more preferably 15 to 120 nm. Various commercially available carbon black products with small average particle sizes are usable.

Preferred white pigments are the same as those recited above as preferred white pigments for use in the pigmented layer (A1) of the first aspect.

Similarly to the pigmented layer (A1) of the first aspect, preferred of the pigments is rutile titanium oxide (white). Titanium oxide to be used preferably has an average particle size of 10 to 500 nm, more preferably 20 to 100 nm. Various commercially available titanium oxide products with small average particle sizes are usable.

The pigmented layer (A3) may contain mica or aluminum powder in addition to the pigment in an amount that does not affect the pigmentation and weatherability of the layer.

Carbon black or titanium oxide used as a pigment in the pigmented layer (A3) is capable of converting laser light to heat. In the case of using a pigment that does not absorb laser light, a compound capable of converting laser light to heat is needed in some cases. In such cases, two or more pigments may be used in combination, or one or more than one pigment may be used in combination with at least one compound capable of converting laser light to heat.

Examples of the compound capable of converting laser light to heat include carbon black and cyanine, phthalocyanine or inorganic infrared absorbers.

The acrylic resin composition used to make the pigmented layer (A3) has a hydroxyl value of 10 to 100 mg KOH/g, preferably 30 to 80 mg KOH/g. As used herein, the term "hydroxyl value" is equivalent to mean the number of functional groups. With a hydroxyl value of at least 10 mg KOH/g, the resin composition acquires sufficient heat resistance and brittleness on crosslinking. With a hydroxyl value less than 100 mg KOH/g, workability is secured.

A melamine crosslinking agent is used to make the pigmented layer (A3) in terms of controlling physical properties, such as heat resistance and tensile elongation at break after crosslinking.

The crosslinking agent is used in an amount of 1.0 to 2.0 equivalent weights, preferably 1.1 to 1.5 equivalent weights, per equivalent weight of the hydroxyl group calculated from the hydroxyl value of the resin. Too low an amount of the crosslinking agent results in poor heat resistance and insufficient brittleness of the pigmented layer (A3). Using too much crosslinking agent makes the layer too brittle, which may impair the workability of the laminate.

The thickness of the pigmented layer (A3) is 10 to 30 µm, preferably 10 to 20 µm. With a thickness of 10 µm or more, sufficient hiding properties are obtained. A thickness of less than 30 µm assures complete removal of the irradiated part on irradiation with a laser beam.

The laminate of the third aspect includes a base layer (B3) laminated with the pigmented layer (A3) and providing a visibly distinguishable color difference from the pigmented layer (A3). The base layer (B3) is made of a crosslinked acrylic resin obtained by crosslinking an acrylic resin composition with an isocyanate crosslinking agent. The acrylic resin composition has a hydroxyl value of 18 to 40 mg KOH/g, preferably 18 to 35 mg KOH/g. The acrylic resin composition includes (B3-1) an acrylic polymer having a reactive functional group, (B3-2) a glycol compound, and (B3-3) a coloring material containing an acrylic resin having a reactive hydroxyl group (reactive with the isocyanate crosslinking agent) and a pigment dispersed in the acrylic resin.

The acrylic polymer (B3-1) having a reactive functional group for use in the base layer (B3) may be selected from the same resins as used to make the pigmented layer (A3).

The base layer (B3) may contain the same glycol compound as used in the base layer (B1) of the first aspect as a flexibility imparting agent to retain the flexibility. Examples of the glycol compound include those enumerated above with respect to the base layer (B1) of the first aspect. The glycol polymers are preferred in terms of volatility, performance of imparting flexibility per unit amount of addition, and water resistance. Poly(tetramethyl glycol) is particularly preferred in terms of versatility and cost.

The glycol compound may be used in an amount of 1% to 10%, preferably 2% to 8%, more preferably 3% to 6%, by weight based on the total solids content of the base layer (B3). i.e., the solid content of the pigment and the resin of the base layer. With a glycol compound content of 1 wt % or less, the film can form a crack on bending in attachment. With a glycol compound content of 10 wt % or more, the laminate (e.g., a label) once attached to a substrate may be reusably strippable without damage.

The base layer (B3) is pigmented in a color that contrasts with the pigmented layer (A3). An acrylic resin containing a reactive hydroxyl group having a pigment dispersed therein is used as a coloring material. By using an acrylic resin containing a reactive hydroxyl group having a pigment dispersed therein as a coloring material, a laminate having both heat resistance and attachment workability is obtained.

The acrylic resin having a reactive hydroxyl group that can be used here is prepared by copolymerizing an acrylic monomer having a reactive hydroxyl group and other acrylic monomer(s).

A recommended proportion of the component derived from the acrylic monomer having a reactive hydroxyl group in the copolymer is usually 3% to 20%, preferably 6% to 15%, by weight. As long as the proportion does not exceed the upper limit, flexibility is secured. As long as the proportion is at least the lower limit, flow in a high temperature environment can be controlled.

Examples of the hydroxyl-containing acrylic monomer include 2-hydroxyethyl acrylate, 2-hydroxypropyl acrylate, 3-hydroxypropyl acrylate, 4-hydroxybutyl acrylate, polyethylene glycol monoacrylate, 5-hydroxyethyl methacrylate, 2-hydroxypropyl methacrylate, 3-hydroxypropyl methacrylate, 4-hydroxybutyl methacrylate, polyethylene glycol monomethacrylate, allyl alcohol, and methallyl alcohol. Preferred of them are 2-hydroxyethyl acrylate and 2-hydroxypropyl acrylate in terms of copolymerizability with other acrylic monomer(s). Particularly preferred of them is 2-hydroxyethyl acrylate. These hydroxyl-containing acrylic monomers may be used either individually or as a combination of two or more thereof.

The pigment that is dispersed in the acrylic resin having a reactive hydroxyl group to provide a coloring material for use in the base layer (B3) is chosen from those described above for use in the pigmented layer (A3).

Preferred of the pigments is rutile titanium oxide (white). Titanium oxide to be used preferably has an average particle size of 10 to 500 nm, more preferably 20 to 100 nm. Various commercially available titanium oxide products with small average particle sizes are usable.

The pigment may be dispersed in the acrylic resin having a reactive hydroxyl group by any method. In view of operation convenience, ordinary stirrers, such as a disper stirrer and a stirring blade, may be used. The coloring material may have the pigment dispersed in an amount of 10 to 400%, preferably 20 to 200%, by weight based on the acrylic resin.

A recommended pigment content in the base layer (B3) is 20% to 120%, preferably 30% to 100%, by weight. A pigment content less than 20 wt % results in insufficient hiding properties. When the amount of the pigment is 120 wt % or more, dispersibility tends to reduce.

The acrylic resin composition used to make the base layer (B3) has a hydroxyl value of 18 to 40 mg KOH/g, preferably 18 to 35 mg KOH/g.

The crosslinking agent used to crosslink the acrylic resin composition used to make the base layer (B3) is an isocyanate crosslinking agent that is of room temperature curing type and easy to handle. An aliphatic isocyanate or an alicyclic isocyanate is particularly preferred. Specific examples of the isocyanate crosslinking agent include those enumerated above with respect to the base layer (B1) of the first aspect.

The crosslinking agent is used in an amount of 1.1 to 1.3 equivalent weights based on the hydroxyl value of the acrylic resin composition used to make the base layer (B3). Too large an amount of the crosslinking agent results in reduced flexibility. Too small an amount of the crosslinking agent results in reduced heat resistance and durability.

The base layer (B3) has a thickness of 30 to 80 µm, preferably 40 to 70 µm. With the thickness of 30 µm or more, the laminate is provided with sufficient flexibility. With the thickness of 80 µm or less, the sheet is prevented from destruction during attachment.

The laminate of the third aspect of the invention further includes a destructible layer (C3) laminated with the base layer (B3). The destructible layer (C3) is made of a crosslinked acrylic resin obtained by crosslinking a mixture of an acrylic resin composition and polymer beads with an isocyanate crosslinking agent. The acrylic resin composition has a hydroxyl value of 20 to 35 mg KOH/g, preferably 25 to 30 mg KOH/g, and includes (C3-1) an acrylic polymer having a reactive functional group, (C3-2) a glycol compound, and (C3-3) a coloring material containing an acrylic resin having a reactive hydroxyl group and a pigment dispersed in the acrylic resin.

The acrylic polymer (C3-1) having a reactive functional group for use to make the destructible layer (C3) may be chosen from those usable to make the pigmented layer (A3).

Similarly to the base layer (B3), the destructible layer (C3) contains a glycol compound to control its flexibility. The glycol compound may be used in an amount of 1% to 10%, preferably 2% to 8%, more preferably 3% to 6%, by weight based on the total solids content of the destructible layer (C3), i.e., the solid content of the pigment and the resin of the destructible layer. With a glycol compound content of 1 wt % or less, the film can form a crack on bending in attachment. With a glycol compound content of 10 wt % or more, the laminate (e.g., a label) attached to a substrate may be reusably strippable without damage.

The destructible layer (C3) may be colored and may be transparent. Where colored, the destructible layer (C3) is colored preferably in the same hue as the base layer (B3). The same coloring material as used in the base layer (B3), i.e. a reactive hydroxyl-containing acrylic resin having a pigment dispersed therein, may be used. The recommended pigment content in the destructible layer (C3) is 10% to 120%, preferably 20% to 100%, by weight. A pigment content less than 5 wt % is unable to assure hiding properties. Using 60 wt % or more of the pigment can result in poor film forming properties in making the layer (C3).

The destructible layer (C3) contains polymer beads as a brittleness imparting component. Preferred polymer beads include acrylic beads, styrene beads, and silicone beads in terms of narrow particle size distribution. Taking heat resistance into consideration, acrylic beads are the most preferred.

The polymer beads must have an average particle size of not greater than the thickness of the destructible layer (C3). The average particle size of the polymer beads is 1 to 100 μm, 1 to 150 μm, preferably 1 to 80 μm, 5 to 100 μm, more preferably 10 to 80 μm. Particles smaller than 1 μm are unable to impart brittleness. Particles greater than 150 μm are liable to cause cracking during attachment.

The polymer beads content is 10% to 280%, preferably 10% to 200%, more preferably 30% to 100%, by volume based on the resin of the destructible layer (C3). At a polymer beads content of 10 vol % or less, no effects of polymer beads is produced. Addition of 280% or more by volume of the polymer beads results in void formation between the particles, which can cause cracking during attachment.

The acrylic resin composition used to make the destructible layer (C3) has a hydroxyl value of 20 to 35 mg KOH/g, preferably 25 to 30 mg KOH/g. With a hydroxyl value of at least 20 mg KOH/g, the resin composition undergoes sufficient crosslinking to acquire heat resistance. With a hydroxyl value less than 35 mg KOH/g, workability is secured.

The crosslinking agent used to crosslink the acrylic resin composition of the destructible layer (C3) is the same isocyanate crosslinking agent as useful in the base layer (B3). An aliphatic isocyanate or an alicyclic isocyanate is particularly preferred.

The crosslinking agent is used in an amount of 1.1 to 1.3 equivalent weights based on the total hydroxyl value of the acrylic resin composition of the destructible layer (C3). Too large an amount of the crosslinking agent results in reduced flexibility. Too small an amount of the crosslinking agent results in reduced heat resistance and durability.

The destructible layer (C3) has a thickness of 20 to 100 μm, preferably 40 to 80 μm. With a thickness of at least 20 μm, the destructible layer (C3) is able to exert sufficient breaking stress on the laminate. With a thickness of 100 μm or less, sufficient attachment workability is secured.

The laminate of the third aspect has a tensile strength of at least 20 N/10 mm, preferably 25 N/10 mm or more, measured in accordance with JIS K7127. A label formed of the laminate with a tensile strength of less than 20 N/10 mm has poor workability in attachment due to lack of stiffness.

Similarly to the label having the laminate of the first aspect, when a label having the laminate of the third aspect is attached to a substrate and peeled off by the hand or with a tool, the film is destroyed. Destruction occurs through various mechanisms. In frequent cases, the laminate unrecoverably undergoes cracking due to the strain caused by the stress accompanying peeling. Known brittle laminates designed to withstand use in high temperatures and be destroyed when peeled are so hard and brittle that they have poor workability or poor conformability to the contour of a substrate when attached to a substrate as a label. In contrast, the laminate of the invention exhibits both workability and destructibility as well as heat resistance by virtue of the elaborated combinations of a resin component having a reaction functional group and a crosslinking agent.

Similarly to the laminate of the first aspect, the laminate of the third aspect may further include an adhesive layer with which it is attached to a substrate. The adhesive layer has a thickness of 15 to 100 μm, preferably 20 to 70 μm, more preferably 25 to 45 μm. A thickness of 15 μm or more assures sufficient adhesion to a substrate. A thickness of less than 100 μm is suitable for the attachment and economically advantageous.

Similarly to the first aspect, the adhesive layer preferably has an adhesive strength of at least 5 N/25.4 mm as measured in a 180 degree peel test, in which a 25.4 mm wide strip of the laminate is left to stand for 24 hours as attached to a substrate and then peeled at 180° using a tensile tester. With the adhesive strength less than 5 N/25.4 mm, the laminate attached to a curved surface tends to have its peripheral portion lifted.

Similarly to the first aspect, the adhesive layer may be made of any resins. However, an acrylic adhesive is preferred in view of weatherability, transparency, and anti-yellowing properties. If desired, the acrylic adhesive may contain additives, such as a tackifier, a UV absorber, a photo stabilizer, and an antioxidant.

The laminate of the third aspect is prepared by coating, or printing (e.g., gravure printing) a pigmented layer-forming resin having a pigment dispersed therein to a carrier film, drying the resin applied to form a pigmented layer (A3), coating, or printing (e.g., gravure printing) a base layer-forming resin having a pigment dispersed therein to the pigmented layer (A3), drying the resin applied to form a base layer (B3), coating, or printing (e.g., gravure printing) a destructible layer-forming resin to the base layer (B3), and drying the resin applied to form a destructible layer (C3). The laminate may be otherwise prepared using known methods for producing a laminate film, for example a method including forming pigmented dry films corresponding to the layers and laminating the dry films by thermopress bonding or with an adhesive or a combination of these methods.

Figure 3:
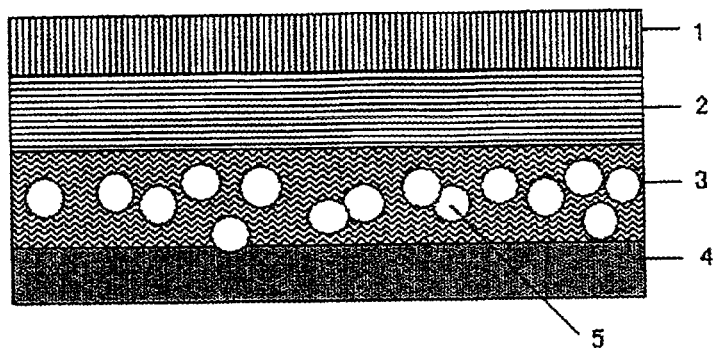
FIG. 3 is a cross-section of a laser-markable laminate according to the third aspect of the invention.

As illustrated in FIG. 3, the laminate of the third aspect includes an adhesive layer 4, (C3) a destructible layer 3 that is destroyed on peeling the laminate, (B3) a base layer 2, and (A3) a pigmented layer 1 that is removability by irradiation with laser light, being stacked one on top of another in the order named. On imagewise irradiating the laminate with laser light, the (A3) pigmented layer 1 is removed in the pattern of laser irradiation to expose the (B3) base layer 2. As a result, a desired image appears on the laminate as a color contrast between the (A3) pigmented layer 1 and the (B3) base layer 2. The (C3) destructible layer 3 contains beads 5 as a brittleness imparting component.

Lasers used for irradiation include those described above with respect to the first aspect. $CO_2$ lasers, Nd:YAG lasers, and so on that are inexpensive and relatively easy to operate are generally used.

The laminate according to any aspect of the invention is markable using a laser printer to provide a desired image according to purpose. It is effectively used as a label or a sheet for a lone period of time in a high temperature environment as marked with, for example, a serial number or a date to provide identifying information, such as production date and use-by date, for the purpose of product management and quality guarantee. After once attached to a substrate, the laminate is destroyed on being peeled off the substrate. That is, the laminate provides a tamper-proof label prevented from unauthorized reuse. In particular, the laminate of the third aspect is effectively useful even in an environment in which it is subjected to 150° C. or higher temperatures for a long period of time.

EXAMPLES

The invention will now be illustrated in greater detail with reference to Examples and Comparative Examples, but it should be understood that the invention is not construed as being limited thereto. Unless otherwise noted, all the parts are by weight.

Examples of First Aspect of the Invention

Reference Example 1

Fifty parts by weight of an acrylic resin KP-1876 (from Nikka Polymer), 50 parts by weight of an acrylic resin 210005 (from Nippon Carbide), 5 parts by weight of CAB (20% solution in MIBK), 18 parts by weight of a melamine crosslinking agent MS-11 (from Sanwa Chemical), 4.5 parts by weight of a curing catalyst CT-5 (from Sanwa Chemical), 15 parts by weight of a coloring material UTCO-591B (from Dainichiseika Color & Chemicals), 15 parts by weight of MIBK, and 30 parts by weight of toluene were mixed to prepare a black resin solution for pigmented layer.

Reference Example 2

Fifty parts by weight of an acrylic resin 2100U5 (from Nippon Carbide), 100 parts by weight of a coloring material UTCO-501 White (from Dainichiseika Color & Chemicals), 7 parts by weight (corresponding to 1.1 equivalent weights based on the reactive functional group of the resin) of an isocyanate crosslinking agent Coronate HK (from Nippon Polyurethane Industry), 10 parts by weight of a glycol compound PTMG-1000M (from Sanyo Chemical Industries), and 10 parts by weight of Solvesso 100 (from Exxon Mobile) were mixed to prepare a white resin solution for base layer.

Reference Example 3

A fifty parts by weight of an acrylic resin SZ6226 (from Nippon Carbide), A hundred parts by weight of a coloring material UTCO-501 White from (Dainichiseika Color & Chemicals), 7 parts by weight (corresponding to 1.0 equivalent weight based on the reactive functional group of the resin) of an isocyanate crosslinking agent Coronate HK (from Nippon Polyurethane Industry), and 25 parts by weight of Solvesso 100 (from Exxon Mobile) were mixed to prepare a white resin solution for destructible layer.

Reference Example 4

A hundred parts by weight of an acrylic adhesive PE-121 (from Nippon Carbide) and 1.8 parts by weight of a crosslinking agent CK-401 (from Nippon Carbide) were mixed to prepare a pressure sensitive adhesive solution A.

Example 1

The black resin solution for pigmented layer prepared in Reference Example 1 was applied to a PET film S75 (from Teijin Du Pont Films) and dried at 90° C. for 2 minutes and then at 140° C. for 3 minutes to form a pigmented layer with a thickness of 15 μm.

The white resin solution for base layer prepared in Reference Example 2 was applied to the pigmented layer to a dry thickness of 50 μm and dried under the same condition as for the pigmented layer to prepare a laminate film having the pigmented layer and a base layer.

The white resin solution for destructible layer prepared in Reference Example 3 was applied to the base layer to a dry thickness of 50 μm to make a laminate film having the pigmented layer, the base layer, and a destructible layer.

The pressure sensitive adhesive solution A obtained in Reference Example 4 was applied to a PET film MRG50 (from Mitsubishi Chemical Polyester Film) and dried at 100° C. for 2 minutes to form an adhesive layer with a thickness of 30 μm. The laminate film and the adhesive layer/PET film composite were joined to bring the destructible layer and the adhesive layer into contact with each other, and the two PET films were stripped off to make a laser-markable brittle laminate.

The composition of the resulting laminate, the results of tensile tests, and the results of performance evaluation are shown in Tables 1 and 2 below.

Example 2

A laminate film having a pigmented layer and a base layer was prepared in the same manner as in Example 1, except for changing the amount of each of the Coronate and PTMG-1000M in the white resin solution for base layer to 5 parts by weight. The amount of the Coronate was 0.8 equivalent weights based on the reactive functional group of the resin.

A destructible layer was formed on the base layer using a white resin solution for destructible layer having the same composition as in Example 1, except for containing an acrylic resin SZ6227 (from Nippon Carbide) in place of SZ6226, changing the amount of the isocyanate crosslinking agent Coronate HK to 10 parts by weight (1.4 equivalent weights based on the reactive functional group of the resin), and further containing 5 parts by weight of PTMG-1000M.

On the resulting laminate having the pigmented layer, the base layer, and the destructible layer was formed a pressure sensitive adhesive layer in the same manner as in Example 1 to make a laser-markable brittle laminate.

The composition of the resulting laminate, the results of tensile tests, and the results performance evaluation are shown in Tables 1 and 2.

Example 3

A laminate film having a pigmented layer and a base layer was prepared in the same manner as in Example 1, except for using 7 parts by weight of the isocyanate crosslinking agent Coronate HK (1.1 equivalent weights based on the reactive functional group of the resin) and 5 parts by weight of PTMG-1000M in the white resin solution for base layer.

A destructible layer was formed on the base layer using a white resin solution for destructible layer having the same composition as in Example 1, except for further containing 5 parts by weight of PTMG-1000M.

On the resulting laminate having the pigmented layer, the base layer, and the destructible layer was formed a pressure sensitive adhesive layer in the same manner as in Example 1 to make a laser-markable brittle laminate.

The composition of the resulting laminate, the results of tensile tests, and the results performance evaluation are shown in Tables 1 and 2.

Example 4

A laser-markable brittle laminate was made in the same manner as in Example 3, except for changing the dry thicknesses of the base layer and the destructible layer to 60 μm and 40 μm, respectively.

The composition of the resulting laminate, the results of tensile tests, and the results performance evaluation are shown in Tables 1 and 2.

Example 5

A laser-markable brittle laminate was made in the same manner as in Example 3, except for changing the dry thicknesses of the base layer and the destructible layer to 30 μm and 70 μm, respectively.

The composition of the resulting laminate, the results of tensile tests, and the results performance evaluation are shown in Tables 1 and 2.

Example 6

A laminate film having a pigmented layer and a base layer was prepared in the same manner as in Example 1, except for changing the amount of PTMG-1000M in the white resin solution for base layer to 5 parts by weight.

A destructible layer was formed on the base layer using a white resin solution for destructible layer having the same composition as in Example 1, except for using an acrylic resin 210005 in place of SZ6226 and further containing 5 parts by weight of PTMG-1000M and 16 parts by weight of polymer beads Art Pearl GR-300 (from Negami Chemical industrial Co., Ltd.). The amount of Coronate HK was 1.1 equivalent weights based on the functional group of the resin. On the resulting laminate having the pigmented layer, the base layer, and the destructible layer was formed a pressure sensitive adhesive layer in the same manner as in Example 1 to make a laser-markable brittle laminate.

The composition of the resulting laminate, the results of tensile tests, and the results performance evaluation are shown in Tables 1 and 2.

Example 7

A laminate film having a pigmented layer and a base layer was prepared in the same manner as in Example 1, except for changing the amount of PTMG-1000M in the white resin solution for base layer to 5 parts by weight.

A destructible layer was formed on the base layer using a white resin solution for destructible layer having the same composition as in Example 1, except for further containing 5 parts by weight of PTMG-1000M and 30 parts by weight of polymer beads Art Pearl GR-300 (from Negami Chemical industrial). On the resulting laminate having the pigmented layer, the base layer, and the destructible layer was formed a pressure sensitive adhesive layer in the same manner as in Example 1 to make a laser-markable brittle laminate.

Comparative Example 1

A laser-markable brittle laminate was made in the same manner as in Example 1, except for omitting the destructible layer and changing the thickness of the base layer to 100 μm.

The composition of the resulting laminate, the results of tensile tests, and the results performance evaluation are shown in Tables 1 and 2.

Comparative Example 2

A laser-markable brittle laminate was made in the same manner as in Example 1, except for omitting the base layer and changing the thickness of the destructible layer to 100 μm.

The composition of the resulting laminate, the results of tensile tests, and the results performance evaluation are shown in Tables 1 and 2.

Comparative Example 3

A laminate film having a pigmented layer, a base layer, and a destructible layer was made in the same manner as in Example 1 with the following exceptions. The acrylic resin 2100U5 and CAB were omitted from the black resin solution for pigmented layer. The amounts of the melamine crosslinking agent MS-11 and the curing catalyst CT-5 in the black resin solution for pigmented layer were changed to 9 parts by weight and 2 parts by weight, respectively. The amount of PTMG-1000M in the white resin solution for base layer was changed to 10 parts by weight. The white resin solution for destructible layer further contained 5 parts by weight of PTMG-1000M.

In the same manner as in Example 1, a pressure sensitive adhesive layer was formed on the laminate film to make a laser-markable brittle laminate.

The composition of the resulting laminate, the results of tensile tests, and the results performance evaluation are shown in Tables 1 and 2.

Comparative Example 4

A laminate film having a pigmented layer and a base layer was prepared in the same manner as in Example 1, except for changing the amount of the isocyanate crosslinking agent Coronate HK in the white resin solution for base, layer to 10 parts by weight (1.6 equivalent weights based on the reactive functional group of the resin) and omitting PTMG-1000M from the same solution.

A destructible layer was formed on the base layer using a white resin solution for destructible layer having the same composition as in Example 1, except for changing the amount of the isocyanate crosslinking agent Coronate HK to 10 parts by weight (1.4 equivalent weights based on the reactive group of the resin) and omitting PTMG-1000M.

In the same manner as in Example 1, a pressure sensitive adhesive layer was formed on the laminate film to make a laser-markable brittle laminate. The composition of the resulting laminate, the results of tensile tests, and the results performance evaluation are shown in Tables 1 and 2.

Comparative Example 5

A laminate having a pigmented layer, a base layer, and a destructible layer was made in the same manner as in Example 6, except for changing the dry thicknesses of the pigmented layer, the base layer, and the destructible layer to 40 μm, 40 μm, and 35 μm, respectively.

In the same manner as in Example 1, a pressure sensitive adhesive layer was formed on the laminate to make a laser-markable brittle laminate.

The composition of the resulting laminate, the results of tensile tests, and the results performance evaluation are shown in Tables 1 and 2.

The physical properties of the laser-markable brittle laminates obtained in Examples 1 to 7 and Comparative Examples 1 to 5 were measured and evaluated in accordance with the following methods (1) through (8).
(1) Tensile Elongation at Break (JIS K7127)
Tensile tester: Tensilon TM-100 (from Toyo Baldwin)
Specimen width: 10 mm
Initial separation between jaws: 100 mm
Testing speed: 200 mm/min
The measurement was taken five times per sample to obtain an average.
(2) Tensile Breaking Strength (JIS K7127)
The same as in (1) above.
(3) Non-Reusability
A 1.5 cm wide, 5 cm long piece of the laminate was attached to a white coated plate and allowed to stand at 23° C. for 72 hours and then removed from the coated plate using a cutter knife. The removed laminate was checked if it was reusable or non-reusable as a result of, for example, destruction. The test was repeated ten times per sample. The non-reusability of the laminate was rated as follows.
Good: The sample became non-reusable nine or more times out of ten.
Medium: The sample became non-reusable seven or eight times out of ten.
Poor: The sample became non-reusable six or fewer times out of ten.
(4) Attachment Workability
A 1.5 cm wide, 5 cm long label having the laminate, the pressure sensitive adhesive layer, and a release liner was prepared. The release liner was stripped, and the label was attached to a white coated paper. During the attachment operation, the label was checked if a break (crack) formed. A total of 50 labels were tested per sample. The attachment workability of the laminate was evaluated from the number of the labels that broke during the attachment operation and rated as follows.
Good: No or only one label out of 50 broke.
Medium: Two to five labels out of 50 broke.
Poor: Six or more labels out of 50 broke.
(5) Resistance to Laser Strike-Through
The laminate was marked with the capital letter "A" with a line width of 130 μm, 250 μm, and 400 μm by laser ablation using a laser marker LP-430 (from Sun Limited) at an output of 10 W and a scan speed of 500 mm/s. The release liner was removed, and the letters were observed with transmitted light from the adhesive layer side. A laminate having the irradiated part partially remaining was rated "good", and a laminate having the irradiated part completely ablated was rated "poor".
(6) Sharpness of Laser Marking
The sample marked with the letter A as obtained in (5) above was evaluated for the sharpness of the mark by observing the edge of the mark, i.e., the ablated portion under an optical microscope BX51 (from Olympus).
Good: The edge of the mark was sharp and neat.
Medium: Part of the edge of the mark had burr.
Poor: The entire edge of the mark had burr.
(7) Legibility of Bar Code
The laminate was marked with an EAN128 bar code under the same condition as in (5) above. The bar code thus marked was read with a bar code reader ten times. The mark that was readable ten times was rated "good", while the mark that was unreadable one or more times was rated "poor".
(8) Heat Resistance
The laminate was marked with an EAN128 bar code in the same manner as in (7) above and allowed to stand at 150° C. for 1000 hours. Thereafter, the bar code was read with a bar code reader ten times. The mark that was readable ten times was rated "good", while the mark that was unreadable one or more times was rated "poor".

TABLE 1

|  |  |  | Example No. |  |  |  |  |  |  | Comparative Example No. |  |  |  |  |
|---|---|---|---|---|---|---|---|---|---|---|---|---|---|---|
|  |  |  | 1 | 2 | 3 | 4 | 5 | 6 | 7 | 1 | 2 | 3 | 4 | 5 |
| Pigmented Layer | Composition | KP-1876 | 50 | 50 | 50 | 50 | 50 | 50 | 50 | 50 | 50 | 100 | — | 50 |
|  |  | 2100U5 | 50 | 50 | 50 | 50 | 50 | 50 | 50 | 50 | 50 | — | 100 | 50 |
|  |  | CAB | 5 | 5 | 5 | 5 | 5 | 5 | 5 | 5 | 5 | — | 10 | 5 |
|  |  | MS-11 | 18 | 18 | 18 | 18 | 18 | 18 | 18 | 18 | 18 | 9 | 18 | 18 |
|  |  | CT-5 | 4.5 | 4.5 | 4.5 | 4.5 | 4.5 | 4.5 | 4.5 | 4.5 | 4.5 | 2 | 4.5 | 4.5 |
|  |  | MBK | 15 | 15 | 15 | 15 | 15 | 15 | 15 | 15 | 15 | 15 | 15 | 15 |
|  |  | Toluene | 30 | 30 | 30 | 30 | 30 | 30 | 30 | 30 | 30 | 30 | 30 | 30 |
|  |  | UTCO-591 Black | 15 | 15 | 15 | 15 | 15 | 15 | 15 | 15 | 15 | 15 | 15 | 15 |
|  | Thickness (μm) |  | 15 | 15 | 15 | 15 | 15 | 15 | 15 | 15 | 15 | 15 | 15 | 40 |
|  | Tensile Elongation at Break (%) |  | 3 | 3 | 3 | 3 | 3 | 3 | 3 | 3 | 3 | 22 | 1 | 3 |
| Base Layer | Composition | 2100U5 | 50 | 50 | 50 | 50 | 50 | 50 | 50 | 50 | — | 50 | 50 | 50 |
|  |  | UTCO-501 White | 100 | 100 | 100 | 100 | 100 | 100 | 100 | 100 | — | 100 | 100 | 100 |
|  |  | Coronate HK | 7 | 5 | 7 | 7 | 7 | 7 | 7 | 7 | — | 7 | 10 | 7 |
|  |  | Solvesso 100 | 10 | 10 | 10 | 10 | 10 | 10 | 10 | 10 | — | 10 | 10 | 10 |
|  |  | PTMG-1000M | 10 | 5 | 5 | 5 | 5 | 5 | 5 | 5 | — | 10 | — | 5 |

TABLE 1-continued

|  |  |  | Example No. |  |  |  |  |  |  | Comparative Example No. |  |  |  |  |
|---|---|---|---|---|---|---|---|---|---|---|---|---|---|---|
|  |  |  | 1 | 2 | 3 | 4 | 5 | 6 | 7 | 1 | 2 | 3 | 4 | 5 |
| Destructible Layer | Composition | Thickness (μm) | 50 | 50 | 50 | 60 | 30 | 50 | 50 | 100 | — | 50 | 50 | 35 |
|  |  | Tensile Elongation at Break (%) | 43 | 28 | 21 | 23 | 17 | 24 | 18 | 38 | — | 90 | 6 | 20 |
|  |  | 2100U5 | — | — | — | — | — | 50 | — | — | — | — | — | 50 |
|  |  | SZ6226 | 50 | — | 50 | 50 | 50 | — | 50 | — | — | 50 | — | — |
|  |  | SZ6227 | — | 50 | — | — | — | — | — | — | 50 | — | 50 | — |
|  |  | UTCO-501 white | 100 | 100 | 100 | 100 | 100 | 100 | 100 | — | 100 | 100 | 100 | 100 |
|  |  | Coronate HK | 7 | 10 | 7 | 7 | 7 | 7 | 7 | — | 7 | 7 | 10 | 7 |
|  |  | Solvesso 100 | 25 | 25 | 25 | 25 | 25 | 25 | 25 | — | 25 | 25 | 25 | 25 |
|  |  | PTMG-1000M | — | 5 | 5 | 5 | 5 | 5 | 5 | — | 5 | 5 | — | 5 |
|  |  | Art Pearl GR-300 | — | — | — | — | — | 16 | 30 | — | — | — | — | 16 |
|  | Thickness (μm) |  | 50 | 50 | 50 | 40 | 70 | 50 | 50 | — | 100 | 50 | 50 | 40 |
|  | Tensile Elongation at Break (%) |  | 5 | 3 | 8 | 8 | 9 | 8 | 8 | — | 3 | 8 | 1 | 8 |
| Tensile Strength of Laminate (N/10 mm) |  |  | 30 | 32 | 28 | 26 | 38 | 42 | 48 | 16 | 44 | 14 | 63 | 49 |
| Tensile Elongation at Break of Laminate (%) |  |  | 8 | 6 | 16 | 24 | 14 | 8 | 6 | 35 | 3 | 62 | 1 | 8 |
| Adhesive Layer | Composition | PE-121 | 100 | 100 | 100 | 100 | 100 | 100 | 100 | 100 | 100 | 100 | 100 | 100 |
|  |  | CK-401 | 1.8 | 1.8 | 1.8 | 1.8 | 1.8 | 1.8 | 1.8 | 1.8 | 1.8 | 1.8 | 1.8 | 1.8 |
|  | Thickness (μm) |  | 30 | 30 | 30 | 30 | 30 | 30 | 30 | 30 | 30 | 30 | 30 | 30 |

TABLE 2

|  |  |  | Laser Marking Test |  |  |  |
|---|---|---|---|---|---|---|
|  | Non-reusability (Peeling/Reattachment) | Attachment Workability | Resistance to Laser Strike-Through | Sharpness | Legibility | Heat Resistance |
| Example 1 | good | good | good | good | good | good |
| Example 2 | good | medium | good | good | good | good |
| Example 3 | good | good | good | good | good | good |
| Example 4 | medium | good | good | good | good | good |
| Example 5 | medium | good | good | good | good | good |
| Example 6 | good | good | good | good | good | good |
| Example 7 | good | good | good | good | good | good |
| Comp. Example 1 | poor | good | good | good | good | poor |
| Comp. Example 2 | good | poor | good | good | good | poor |
| Comp. Example 3 | poor | good | good | good | good | good |
| Comp. Example 4 | poor | poor | good | good | good | good |
| Comp. Example 5 | poor | medium | poor | poor | poor | good |

Examples of Second Aspect of Invention

Reference Example 5

Fifty parts by weight of an acrylic resin KP-1876 (from Nikka Polymer), 20 parts by weight of CAB (20% solution in MIBK), 100 parts by weight of a coloring material UTCO-501 White (from Dainichiseika Color & Chemicals), 9 parts by weight of a melamine crosslinking agent MS-11 (from Sanwa Chemical) (1.0 equivalent weight based on the reactive functional group of the resin), 3 parts by weight of a curing catalyst CT-5 (from Sanwa Chemical), 2 parts by weight of a glycol compound PTMG-1000M (from Sanyo Chemical Industries), and 5 parts by weight of Solvesso 100 (from Exxon Mobile) were mixed to prepare a white resin solution for destructible layer.

Reference Example 6

Fifty parts by weight of an acrylic resin 2100U5 (from Nippon Carbide), 100 parts by weight of a coloring material UTCO-501 White (from Dainichiseika Color & Chemicals), 20 parts by weight (corresponding to 1.0 equivalent weight based on the reactive functional group of the resin) of an isocyanate crosslinking agent Sumidule N75 (from Sumitomo Chemical), 6 parts by weight of a glycol compound PTMG-1000M (from Sanyo Chemical Industries), and 5 parts by weight of Solvesso 100 (from Exxon Mobile) were mixed to prepare a white resin solution for base layer.

Example 8

The black resin solution for pigmented layer prepared in Reference Example 1 was applied to a PET film S75 (from Teijin Du Pont Films) and dried at 90° C. for 2 minutes and then at 140° C. for 3 minutes to form a pigmented layer with a thickness of 15 μm.

The white resin solution for destructible layer prepared in Reference Example 5 was applied to the pigmented layer to a dry thickness of 30 μm and dried under the same condition as for the pigmented layer to prepare a laminate film having the pigmented layer and a destructible layer.

The white resin solution for base layer prepared in Reference Example 6 was applied to the destructible layer to a dry thickness of 70 μm to make a laminate having the pigmented layer, the destructible layer, and a base layer.

Separately, the pressure sensitive adhesive solution A obtained in Reference Example 4 was applied to a PET film MRG50 (from Mitsubishi Chemical Polyester Film) and dried at 100° C. for 2 minutes to form an adhesive layer with a thickness of 30 μm. The laminate film and the adhesive layer/PET film composite were joined to bring the base layer and the adhesive layer into contact with each other. The two PET films were stripped off to make a laser-markable laminate.

The composition of the resulting laminate, the results of tensile tests, and the results performance evaluation are shown in Tables 3 and 4 below.

Example 9

A laser-markable brittle laminate was made in the same manner as in Example 8, except for changing the dry thicknesses of the destructible layer and the base layer to 60 μm and 40 μm, respectively.

The composition of the resulting laminate, the results of tensile tests, and the results performance evaluation are shown in Tables 3 and 4.

Examples 10 and 11

Laminates having a pigmented layer, a destructible layer, and a base layer were obtained in the same manner as in Examples 8 and 9, except for using 50 parts by weight of an acrylic resin SZ6226 (from Nippon Carbide) as a resin of the base layer (the amount of Sumidule corresponded to 0.9 equivalent weights based on the reactive functional group of the resin). The composition of the resulting laminates, the results of tensile tests, and the results performance evaluation are shown in Tables 3 and 4.

Example 12

A laminate film having a pigmented layer and a destructible layer was prepared in the same manner as in Example 8, except for using 50 parts by weight of an acrylic resin 2100U5 (from Nippon Carbide) and replacing MS-II as a crosslinking agent and CT-5 with 7 parts by weight (corresponding to 1.1 equivalent weights based on the reactive functional group of the resin) of an isocyanate crosslinking agent Coronate HK (from Nippon Polyurethane Industry). A base layer was then formed using the same white resin solution as used in Example 8, except for using an acrylic resin SZ6227 (from Nippon Carbide) (the amount of Sumidule corresponded to 0.9 equivalent weights based on the reactive functional group of the resin) and changing the amount of PTMG-1000M to 4 parts by weight, to prepare a laminate having the pigmented layer, the destructible layer, and a base layer. A pressure sensitive adhesive layer was formed in the same manner as in Example 8 to make a laser-markable brittle laminate.

The composition of the resulting laminate, the results of tensile tests, and the results performance evaluation are shown in Tables 3 and 4.

Example 13

A laminate was made in the same manner as in Example 12, except for changing the dry thicknesses of the destructible layer and the base layer to 60 μm and 40 μm, respectively.

The composition of the resulting laminate, the results of tensile tests, and the results performance evaluation are shown in Tables 3 and 4.

Comparative Example 6

A laser-markable brittle laminate was made in the same manner as in Example 8, except for omitting the base layer and changing the thicknesses of the pigmented layer and the destructible layer to 20 μm and 80 μm, respectively.

The composition of the resulting laminate, the results of tensile tests, and the results performance evaluation are shown in Tables 3 and 4.

Comparative Example 7

A laser-markable brittle laminate was made in the same manner as in Example 8, except for omitting the destructible layer and changing the thicknesses of the pigmented layer and the base layer to 20 μm and 80 μm, respectively.

The composition of the resulting laminate, the results of tensile tests, and the results performance evaluation are shown in Tables 3 and 4.

Comparative Examples 8 to 10

Laminates were obtained in the same manner as in Example 8, except for changing the compositions and thicknesses of the pigmented layer, the destructible layer, and the base layer as shown in Table 3. A pressure sensitive adhesive layer was provided on each laminate in the same manner as in Example 8 to make laser-markable brittle laminates.

The composition of the resulting laminates, the results of tensile tests, and the results performance evaluation are shown in Tables 3 and 4.

The physical properties of the brittle, laser-markable laminates obtained in Examples 8 to 13 and Comparative Examples 6 to 10 were measured or evaluated by the methods (1) to (8) described above.

TABLE 3

|  |  |  | Example No. | | | | | | Comparative Example No. | | | | |
|---|---|---|---|---|---|---|---|---|---|---|---|---|---|
|  |  |  | 8 | 9 | 10 | 11 | 12 | 13 | 6 | 7 | 8 | 9 | 10 |
| Pigmented Layer | Composition | KP-1876 | 50 | 50 | 50 | 50 | 50 | 50 | 50 | 50 | 100 | — | 50 |
|  |  | 2100U5 | 50 | 50 | 50 | 50 | 50 | 50 | 50 | 50 | — | 100 | 50 |
|  |  | CAB | 5 | 5 | 5 | 5 | 5 | 5 | 5 | 5 | — | 10 | 5 |
|  |  | MS-11 | 18 | 18 | 18 | 18 | 18 | 18 | 18 | 18 | 9 | 18 | 18 |
|  |  | CT-5 | 4.5 | 4.5 | 4.5 | 4.5 | 4.5 | 4.5 | 4.5 | 4.5 | 2 | 4.5 | 4.5 |
|  |  | MBK | 15 | 15 | 15 | 15 | 15 | 15 | 15 | 15 | 15 | 15 | 15 |
|  |  | Toluene | 30 | 30 | 30 | 30 | 30 | 30 | 30 | 30 | 30 | 30 | 30 |
|  |  | UTCO-591 Black | 15 | 15 | 15 | 15 | 15 | 15 | 15 | 15 | 15 | 15 | 15 |
|  | Thickness (μm) |  | 15 | 15 | 15 | 15 | 15 | 15 | 20 | 20 | 15 | 15 | 40 |
|  | Tensile Elongation at Break (%) |  | 3 | 3 | 3 | 3 | 3 | 3 | 3 | 3 | 22 | 1 | 3 |
| Destructible Layer | Composition | KP-1876 | 50 | 50 | 50 | 50 | — | — | — | — | — | — | 50 |
|  |  | CAB | 20 | 20 | 20 | 20 | — | — | — | — | — | — | 20 |
|  |  | MS-11 | 9 | 9 | 9 | 9 | — | — | — | — | — | — | 9 |
|  |  | CT-5 | 3 | 3 | 3 | 3 | — | — | — | — | — | — | 3 |
|  |  | 2100U5 | — | — | — | — | 50 | 50 | 50 | — | 50 | 50 | — |
|  |  | UTCO-501 White | 100 | 100 | 100 | 100 | 100 | 100 | 100 | — | 100 | 100 | 100 |
|  |  | Coronate HK | — | — | — | — | 7 | 7 | 7 | — | 7 | 7 | — |

TABLE 3-continued

|  |  |  | Example No. | | | | | | Comparative Example No. | | | | |
|---|---|---|---|---|---|---|---|---|---|---|---|---|---|
|  |  |  | 8 | 9 | 10 | 11 | 12 | 13 | 6 | 7 | 8 | 9 | 10 |
|  |  | Solvesso 100 | 5 | 5 | 5 | 5 | 5 | 5 | 5 | — | 5 | 5 | 5 |
|  |  | PTMG-1000M | 2 | 2 | 2 | 2 | 2 | 2 | 1 | — | 5 | — | 2 |
|  |  | Art Pearl GR-300 | — | — | — | — | — | — | — | — | — | — | — |
|  | Thickness (μm) |  | 30 | 60 | 30 | 60 | 30 | 60 | 80 | — | 60 | 60 | 35 |
|  | Tensile Elongation at Break (%) |  | 6 | 7 | 6 | 7 | 5 | 6 | 6 | — | 25 | 1 | 6 |
| Base | Composition | 2100U5 | 50 | 50 | — | — | — | — | — | 50 | 50 | 50 | 50 |
| Layer |  | SZ6226 | — | — | 50 | 50 | — | — | — | — | — | — | — |
|  |  | SZ6227 | — | — | — | — | 50 | 50 | — | — | — | — | — |
|  |  | UTCO-501 White | 100 | 100 | 100 | 100 | 100 | 100 | — | 100 | 100 | 100 | 100 |
|  |  | Coronate HK | — | — | — | — | — | — | — | — | 7 | 7 | — |
|  |  | Sumidule N75 | 20 | 20 | 20 | 20 | 20 | 20 | — | 20 | — | — | 20 |
|  |  | Solvesso 100 | 5 | 5 | 5 | 5 | 5 | 5 | — | 5 | 5 | 5 | 5 |
|  |  | PTMG-1000M | 6 | 6 | 6 | 6 | 4 | 4 | — | 6 | 10 | — | 6 |
|  |  | Art Pearl GR-300 | — | — | — | — | — | — | — | — | — | — | — |
|  | Thickness (μm) |  | 70 | 40 | 70 | 40 | 70 | 40 | — | 80 | 40 | 40 | 40 |
|  | Tensile Elongation at Break (%) |  | 16 | 13 | 18 | 15 | 17 | 14 | — | 18 | 80 | 1 | 14 |
| Tensile Strength of Laminate (N/10 mm) |  |  | 38 | 42 | 40 | 52 | 42 | 58 | 45 | 19 | 15 | 63 | 50 |
| Tensile Elongation at Break of Laminate (%) |  |  | 8 | 6 | 10 | 13 | 17 | 12 | 4 | 16 | 6 | 1 | 7 |
| Adhesive | Compo- | PE-121 | 100 | 100 | 100 | 100 | 100 | 100 | 100 | 100 | 100 | 100 | 100 |
| Layer | sition | CK-401 | 1.8 | 1.8 | 1.8 | 1.8 | 1.8 | 1.8 | 1.8 | 1.8 | 1.8 | 1.8 | 1.8 |
|  | Thickness (μm) |  | 30 | 30 | 30 | 30 | 30 | 30 | 30 | 30 | 30 | 30 | 30 |

TABLE 4

|  | Non-reusability (Peeling/Reattachment) | Attachment Workability | Laser Marking Test | | | Heat Resistance |
|---|---|---|---|---|---|---|
|  |  |  | Resistance to Laser Strike-Through | Sharpness | Legibility |  |
| Example 8 | good | good | good | good | good | good |
| Example 9 | medium | good | good | good | good | good |
| Example 10 | good | good | good | good | good | good |
| Example 11 | medium | good | good | good | good | good |
| Example 12 | good | good | good | good | good | good |
| Example 13 | good | good | good | good | good | good |
| Comp. Example 6 | good | poor | good | good | good | poor |
| Comp. Example 7 | poor | good | good | good | good | poor |
| Comp. Example 8 | poor | poor | good | medium | good | good |
| Comp. Example 9 | good | medium | good | good | medium | good |
| Comp. Example 10 | good | poor | poor | poor | poor | good |

Examples of Third Aspect of the Invention

Reference Example 7

Resin of Pigmented Layer

Fifty parts by weight of an acrylic resin KP-1876 (from Nikka Polymer), 50 parts by weight of an acrylic resin 2100U7 (from Nippon Carbide), 5 parts by weight of CAB (20% solution in MIBK), 15 parts by weight of a coloring material FPGS-5910 (black pigment from Dainichiseika Color & Chemicals), and 23 parts by weight of MIBK were mixed. To the mixture were added 18 parts by weight of a melamine crosslinking agent MS-11 (from Sanwa Chemical) and 4.5 parts by weight of a curing catalyst CT-5 (from Sanwa Chemical) to prepare a black resin solution for pigmented layer.

Reference Example 8

Preparation of Coloring Materials

Twenty-one parts by weight of an acrylic resin MN-0500 (from Nippon Carbide; hydroxyl value: 10 mg KOH/g). 58 parts by weight of titanium oxide CR-90 (from Ishihara Sangyo), 3 parts by weight of a glycol compound PTMG-1000M (from Sanyo Chemical Industries; hydroxyl value: 111 mg KOH/g), and 21 parts by weight of ethyl acetate were mixed in a disper stirrer to prepare coloring material A (hydroxyl value: 5.3 mg KOH/g).

Coloring materials B to E were prepared in the same manner as for coloring material A, except for changing the composition as shown in Table 5 below.

TABLE 5

|  | Hydroxyl Value (mg KOH/g) | Coloring Material | | | | |
|---|---|---|---|---|---|---|
|  |  | A | B | C | D | E |
| Composition: |  |  |  |  |  |  |
| MN-500 | 10 | 21 | — | — | — | — |
| MN-501 | 32 | — | 21 | — | — | — |
| MN-502 | 61 | — | — | 21 | — | — |
| MN-503 | 3 | — | — | — | 21 | — |
| MN-504 | 85 | — | — | — | — | 21 |
| CR-90 | — | 58 | 58 | 58 | 58 | 58 |
| Ethyl Acetate | — | 21 | 21 | 21 | 21 | 21 |
| PTMG-1000M | 111 | 3 | 3 | 3 | 3 | 3 |
| Hydroxyl Value of Coloring Material (mg KOH/g) |  | 5.3 | 9.8 | 15.7 | 3.8 | 20.6 |

Reference Example 9

Resin of Base Layer

Twenty parts by weight of an acrylic resin 2100U7 (from Nippon Carbide: hydroxyl value: 77.2 mg KOH/g), 100 parts by weight of coloring material A (hydroxyl value: 5.3 ma KOH/g), 3 parts by weight of a glycol compound PTMG-1000M (From Sanyo Chemical Industries; hydroxyl value: 111 mg KOH/g), and 10 parts by weight of Solvesso 100 (from Exxon Mobile) were mixed to prepare a resin composition having a hydroxyl value of 18.3 mg KOH/g. To the composition was added 10.8 parts by weight (1.2 equivalent weights based on the hydroxyl value) of an isocyanate crosslinking agent Coronate HK (from Nippon Polyurethane Industry) to prepare a white resin solution for base layer.

Other resins for base layer were prepared in the same manner as described above, except for changing the composition as shown in Table 6 below.

Reference Example 10

Resin for Destructible Layer

Fifty parts by weight of an acrylic resin 210007 (from Nippon Carbide; hydroxyl value: 77.2 me KOH/g), 100 parts by weight of coloring material A (hydroxyl value: 5.3 mg KOH/g), 5 parts by weight of a glycol compound PTMG-1000M (From Sanyo Chemical Industries: hydroxyl value: 111 mg KOH/g), and 25 parts by weight of Solvesso 100 (from Exxon Mobile) were mixed. Sixteen parts by weight of polymer beads Art Pearl GR-300 (from Negami Chemical industrial Co. Ltd.) were added thereto to prepare a resin composition having a hydroxyl value of 25.2 mg KOH/g. To the composition was added 22.2 parts by weight (1.2 equivalent weights based on the hydroxyl value) of an isocyanate crosslinking agent Coronate HK (from Nippon Polyurethane Industry) to prepare a white resin solution for destructible layer.

Example 14

The black resin solution for pigmented layer prepared in Reference Example 7 was applied to a PET film S75 (from Teijin Du Pont Films) and dried at 90° C. for 2 minutes and then at 140° C. for 3 minutes to form a pigmented layer with a thickness of 15 μm.

The white resin solution for base layer prepared in Reference Example 9 was applied to the pigmented layer to a dry thickness of 50 μm and dried under the same condition as for the pigmented layer to prepare a laminate film having the pigmented layer and a base layer.

The white resin solution for destructible layer prepared in Reference Example 10 was applied to the base layer to a dry thickness of 55 μm to make a laminate having the pigmented layer, the base layer, and a destructible layer.

Separately, the pressure sensitive adhesive solution A obtained in Reference Example 4 was applied to a PET film MRG50 (from Mitsubishi Chemical Polyester Film) and dried at 100° C. for 2 minutes to form an adhesive layer with a thickness of 30 μm. The two PET films were joined to bring the base layer and the adhesive layer into contact with each other and then stripped off to provide a laser-markable brittle laminate.

The composition of the resulting laminate and the results of testing are shown in Tables 6 and 7 below.

Examples 15 to 25

Laser-markable brittle laminates were made in the same manner as in Example 14, except for changing the resin compositions as shown in Table 6. The composition of the resulting laminates and the results of testing are shown in Tables 6 and 7.

Comparative Example 11

A laser-markable brittle laminate was made in the same manner as in Example 14, except for using coloring material D in place of coloring material A. The composition of the resulting laminates and the results of testing are shown in Tables 6 and 7.

Comparative Examples 12 to 15

Laser-markable brittle laminates were made in the same manner as in Example 14, except for changing the resin compositions as shown in Table 6. The composition of the resulting laminates and the results of testing are shown in Tables 6 and 7.

TABLE 6

| | | | | Example No. | | | | | | | | |
|---|---|---|---|---|---|---|---|---|---|---|---|---|
| | | | | 14 | 15 | 16 | 17 | 18 | 19 | 20 | 21 | 22 |
| Pigmented Layer | Acrylic Resin | Composition | KP-1876 | 50 | 50 | 50 | 50 | 50 | 50 | 50 | 50 | 50 |
| | | | 2100U7 | 50 | 50 | 50 | 50 | 50 | 50 | 50 | 50 | 50 |
| | | | CAB | 5 | 5 | 5 | 5 | 5 | 5 | 5 | 5 | 5 |
| | | | CT-5 | 4.5 | 4.5 | 4.5 | 4.5 | 4.5 | 4.5 | 4.5 | 4.5 | 4.5 |
| | | | FPGS-5910 | 15 | 15 | 15 | 15 | 15 | 15 | 15 | 15 | 15 |
| | | Hydroxyl Value (mg KOH/g) | | 63 | 63 | 63 | 63 | 63 | 63 | 63 | 63 | 63 |
| | | Crosslinking Agent (A-4) | MS-11 (parts by weight) | 18 | 18 | 18 | 18 | 18 | 18 | 18 | 18 | 18 |
| | | Eq. Wt. of Crosslinking Agent based on OH Group | | 1.1 | 1.1 | 1.1 | 1.1 | 1.1 | 1.1 | 1.1 | 1.1 | 1.1 |
| | | Thickness (μm) | | 15 | 15 | 15 | 15 | 15 | 15 | 15 | 15 | 15 |
| Base Layer | Acrylic Resin | Composition | 2100U7 | 20 | 20 | 20 | 50 | 50 | 50 | 50 | 50 | 50 |
| | | | Coloring Material A (OH Value = 5.3) | 100 | — | — | 100 | 100 | — | 100 | 100 | 100 |
| | | | Coloring Material B (OH Value = 9.8) | — | 100 | — | — | — | 100 | — | — | — |
| | | | Coloring Material C (OH Value = 15.7) | — | — | 100 | — | — | — | — | — | — |
| | | | Coloring Material D | — | — | — | — | — | — | — | — | — |

TABLE 6-continued

|  |  |  |  |  |  |  |  |  |  |  |  |
|---|---|---|---|---|---|---|---|---|---|---|---|
|  |  |  | (OH Value = 3.8) |  |  |  |  |  |  |  |  |
|  |  |  | Coloring Material E | — | — | — | — | — | — | — | — | — |
|  |  |  | (OH Value = 20.6) |  |  |  |  |  |  |  |  |
|  |  |  | PTMG-1000M | 3 | 3 | 3 | 5 | 5 | 5 | 5 | 5 | 5 |
|  |  |  | OH Value of Resin (mg KOH/g) | 18.1 | 21.5 | 26.0 | 30.0 | 30.0 | 32.7 | 30.0 | 30.0 | 30.0 |
|  | Crosslinking |  | Coronate UK | 10.8 | 12.8 | 18.2 | 22.2 | 22.2 | 24.2 | 20.4 | 22.2 | 22.2 |
|  | Agent (B-4) |  | (part) |  |  |  |  |  |  |  |  |  |
|  | Eq. Wt. of Crosslinking Agent |  |  | 1.2 | 1.2 | 1.2 | 1.2 | 1.2 | 1.2 | 1.1 | 1.2 | 1.2 |
|  | based on OH Group |  |  |  |  |  |  |  |  |  |  |  |
|  | Thickness (μm) |  |  | 50 | 50 | 50 | 50 | 50 | 50 | 50 | 50 | 50 |
| Destructible | Acrylic | Compo- | 2100U7 | 50 | 50 | 50 | 50 | 50 | 50 | 50 | 50 | 50 |
| Layer | Resin | sition | Coloring Material A | 100 | 100 | 100 | 100 | — | 100 | 100 | 100 | 100 |
|  |  |  | (OH Value = 5.3) |  |  |  |  |  |  |  |  |  |
|  |  |  | Coloring Material C | — | — | — | — | — | — | — | — | — |
|  |  |  | (OH Value = 15.7) |  |  |  |  |  |  |  |  |  |
|  |  |  | Coloring Material D | — | — | — | — | 100 | — | — | — | — |
|  |  |  | (OH Value = 3.8) |  |  |  |  |  |  |  |  |  |
|  |  |  | Coloring Material E | — | — | — | — | — | — | — | — | — |
|  |  |  | (OH Value = 20.6) |  |  |  |  |  |  |  |  |  |
|  |  |  | PTMG-1000M | 5 | 5 | 5 | 5 | 5 | 5 | 5 | 5 | 5 |
|  |  |  | OH Value of Resin (mg KOH/g) | 25.2 | 25.2 | 25.2 | 25.2 | 24.5 | 25.2 | 25.2 | 25.2 | 25.2 |
|  | Art Pearl GR-300 |  |  | 16 | 16 | 16 | 16 | 16 | 16 | 16 | 16 | 16 |
|  | Crosslinking |  | Coronate HK | 22.2 | 22.2 | 22.2 | 22.2 | 21.5 | 22.2 | 22.2 | 20.4 | 24.1 |
|  | Agent (C-4) |  | (part by weight) |  |  |  |  |  |  |  |  |  |
|  | Eq. Wt. of Crosslinking Agent |  |  | 1.2 | 1.2 | 1.2 | 1.2 | 1.2 | 1.2 | 1.2 | 1.1 | 1.3 |
|  | based on OH Group |  |  |  |  |  |  |  |  |  |  |  |
|  | Thickness (μm) |  |  | 55 | 55 | 55 | 40 | 70 | 55 | 55 | 55 | 55 |
| Adhesive | Compo- | PE-121 |  | 100 | 100 | 100 | 100 | 100 | 100 | 100 | 100 | 100 |
| Layer | sition | CK-401 |  | 1.8 | 1.8 | 1.8 | 1.8 | 1.8 | 1.8 | 1.8 | 1.8 | 1.8 |
|  | Thickness (Mm) |  |  | 30 | 30 | 30 | 30 | 30 | 30 | 30 | 30 | 30 |

|  |  |  |  | Example No. | | | Comparative Example No. | | | | |
|---|---|---|---|---|---|---|---|---|---|---|---|
|  |  |  |  | 23 | 24 | 25 | 11 | 12 | 13 | 14 | 15 |
| Pigmented | Acrylic | Compo- | KP-1876 | 50 | 50 | 50 | 50 | 50 | 50 | 50 | 50 |
| Layer | Resin | sition | 2100U7 | 50 | 50 | 50 | 50 | 50 | 50 | 50 | 50 |
|  |  |  | CAB | 5 | 5 | 5 | 5 | 5 | 5 | 5 | 5 |
|  |  |  | CT-5 | 4.5 | 4.5 | 4.5 | 4.5 | 4.5 | 4.5 | 4.5 | 4.5 |
|  |  |  | FPGS-5910 | 15 | 15 | 15 | 15 | 15 | 15 | 15 | 15 |
|  |  | Hydroxyl Value |  | 63 | 63 | 63 | 63 | 63 | 63 | 63 | 63 |
|  |  | (mg KOH/g) |  |  |  |  |  |  |  |  |  |
|  | Crosslinking |  | MS-11 | 18 | 18 | 18 | 18 | 18 | 18 | 18 | 18 |
|  | Agent (A-4) |  | (parts by weight) |  |  |  |  |  |  |  |  |
|  | Eq. Wt. of Crosslinking Agent |  |  | 1.1 | 1.1 | 1.1 | 1.1 | 1.1 | 1.1 | 1.1 | 1.1 |
|  | based on OH Group |  |  |  |  |  |  |  |  |  |  |
|  | Thickness (μm) |  |  | 15 | 15 | 15 | 15 | 15 | 15 | 15 | 15 |
| Base | Acrylic | Compo- | 2100U7 | 50 | 50 | 50 | 20 | 50 | 60 | 50 | 50 |
| Layer | Resin | sition | Coloring Material A | 100 | — | — | — | — | — | 100 | 100 |
|  |  |  | (OH Value = 5.3) |  |  |  |  |  |  |  |  |
|  |  |  | Coloring Material B | — | 100 | 100 | — | — | — | — | — |
|  |  |  | (OH Value = 9.8) |  |  |  |  |  |  |  |  |
|  |  |  | Coloring Material C | — | — | — | — | — | — | — | — |
|  |  |  | (OH Value = 15.7) |  |  |  |  |  |  |  |  |
|  |  |  | Coloring Material D | — | — | — | 100 | — | — | — | — |
|  |  |  | (OH Value = 3.8) |  |  |  |  |  |  |  |  |
|  |  |  | Coloring Material E | — | — | — | — | 100 | 100 | — | — |
|  |  |  | (OH Value = 20.6) |  |  |  |  |  |  |  |  |
|  |  |  | PTMG-1000M | 5 | 2 | 2 | 3 | 5 | 5 | 5 | 5 |
|  |  | OH Value of Resin (mg KOH/g) |  | 30.0 | 31.2 | 31.2 | 17.0 | 39.2 | 41.4 | 30.0 | 30.0 |
|  | Crosslinking |  | Coronate UK | 22.2 | 20.8 | 25.4 | 6.8 | 19.4 | 29.8 | 25.9 | 25.9 |
|  | Agent (B-4) |  | (part) |  |  |  |  |  |  |  |  |
|  | Eq. Wt. of Crosslinking Agent |  |  | 1.2 | 1.1 | 1.3 | 0.8 | 0.8 | 1.1 | 1.4 | 1.4 |
|  | based on OH Group |  |  |  |  |  |  |  |  |  |  |
|  | Thickness (μm) |  |  | 50 | 40 | 40 | 50 | 50 | 50 | 50 | 50 |
| Destructible | Acrylic | Compo- | 2100U7 | 50 | 20 | 50 | 50 | 50 | 50 | 50 | 20 |
| Layer | Resin | sition | Coloring Material A | 100 | — | — | 100 | 100 | 100 | — | — |
|  |  |  | (OH Value = 5.3) |  |  |  |  |  |  |  |  |
|  |  |  | Coloring Material C | — | 50 | 50 | — | — | — | — | 100 |
|  |  |  | (OH Value = 15.7) |  |  |  |  |  |  |  |  |
|  |  |  | Coloring Material D | — | — | — | — | — | — | — | — |
|  |  |  | (OH Value = 3.8) |  |  |  |  |  |  |  |  |
|  |  |  | Coloring Material E | — | — | — | — | — | — | 100 | — |
|  |  |  | (OH Value = 20.6) |  |  |  |  |  |  |  |  |
|  |  |  | PTMG-1000M | 5 | 5 | 2 | 5 | 5 | 5 | 5 | 3 |
|  |  | OH Value of Resin (mg KOH/g) |  | 25.2 | 24.9 | 34.0 | 25.2 | 25.2 | 25.2 | 33.0 | 21.0 |
|  | Art Pearl GR-300 |  |  | 16 | 16 | 16 | 16 | 16 | 16 | 16 | 16 |
|  | Crosslinking |  | Coronate HK | 22.2 | 14.0 | 23.7 | 19.3 | 28.6 | 22.5 | 24.2 | 18.1 |
|  | Agent (C-4) |  | (part by weight) |  |  |  |  |  |  |  |  |
|  | Eq. Wt. of Crosslinking Agent |  |  | 1.2 | 1.3 | 1.3 | 0.8 | 1.4 | 1.1 | 0.8 | 1.4 |

TABLE 6-continued

|  |  |  |  |  |  |  |  |  |  |  |
|---|---|---|---|---|---|---|---|---|---|---|
|  | based on OH Group |  |  |  |  |  |  |  |  |  |
|  | Thickness (μm) |  | 55 | 60 | 60 | 55 | 100 | 100 | 55 | 55 |
| Adhesive | Compo- | PE-121 | 100 | 100 | 100 | 100 | 100 | 100 | 100 | 100 |
| Layer | sition | CK-401 | 1.8 | 1.8 | 1.8 | 1.8 | 1.8 | 1.8 | 1.8 | 1.8 |
|  | Thickness (Mm) |  | 30 | 30 | 30 | 30 | 30 | 30 | 30 | 30 |

TABLE 7

|  |  |  |  | User Marking Test |  |  |  |
|---|---|---|---|---|---|---|---|
|  | Non-reusability | Attachment Workability | Label Heat Resistance | Resistance to Laser Strike-Through | Sharpness | Legibility | Heat Resistance |
| Example 14 | B | good | good | good | good | good | good |
| Example 15 | A | good | good | good | good | good | good |
| Example 16 | A | good | good | good | pood | good | good |
| Example 17 | A | good | good | good | good | good | good |
| Example 18 | A | good | good | good | good | good | good |
| Example 19 | A | good | good | good | good | good | good |
| Example 20 | A | good | good | good | good | good | Rood |
| Example 21 | B | good | good | good | good | good | good |
| Example 22 | B | good | good | good | good | good | good |
| Example 23 | A | medium | good | good | good | good | good |
| Example 24 | A | good | good | good | good | good | good |
| Example 25 | A | good | good | good | good | good | good |
| Comparative Example 11 | E | good | good | good | good | good | good |
| Comparative Example 12 | D | poor | good | good | good | good | good |
| Comparative Example 13 | D | medium | good | good | good | good | good |
| Comparative Example 14 | E | medium | good | good | good | good | good |
| Comparative Example 15 | E | poor | good | good | good | good | good |

The physical properties of the laser markable brittle laminates obtained in Examples 14 to 25 and Comparative Examples 11 to 15 were measured or evaluated in accordance with the methods (4) to (8) described supra and the methods (9) and (10) described infra.

(9) Hydroxyl Value

A sample to be analyzed weighing 2.00 g was put in a flat bottom flask, and 5 ml of an acetylation reagent (prepared by putting 25 g of acetic anhydride in a 100 ml measuring flask and adding pyridine to make 100 ml) was added thereto, followed by heating at 95° to 100° C. for 1 hour. One milliliter of water was added thereto, and the heating was continued for an additional 10 minutes, followed by cooling to room temperature. To the system were added 5 ml of ethanol and a few drops of a phenolphthalein solution. A 0.5 mol/L ethanolic potassium hydroxide solution was added until the titration end point (when the deep pink color of the system did not disappear any more). Separately, a blank test was carried out. The hydroxyl value of the sample was calculated from formula:

$$A=(B-C)\times f\times 28.05/S$$

where A is a hydroxyl value: B is the amount (ml) of a 0.5 ml/L ethanolic potassium hydroxide solution used in the blank test; C: is the amount (ml) of a 0.5 ml/L ethanolic potassium hydroxide solution used in the titration; f is a factor of the 0.5 ml/L ethanolic potassium hydroxide solution; and S is the mass (g) of the sample.

(10) Non-Reusability

A 1.5 cm wide, 5 cm long piece of the laminate was attached to a white coated plate and allowed to stand at 23° C. for 72 hours and then removed from the coated plate using a cutter knife. The removed laminate was checked if it was reusable or non-reusable as a result of, for example, destruction. The test was repeated ten times per sample. The non-reusability of the laminate was rated on an A to E scale as follows.

A: The sample became non-reusable nine or more times out of ten.
B: The sample became non-reusable eight times out of ten.
C: The sample became non-reusable seven times out of ten.
D: The sample became non-reusable six times out of ten.
E: The sample became non-reusable five or fewer times out of ten.

INDUSTRIAL APPLICABILITY

The laser-markable laminates according to the first and second aspects of the invention do not suffer from appearance defects, such as a crack, nor fall off even when exposed to severe temperature conditions and are attachable even to a curved surface with conformability. For use as a label, they have good workability in being attached to a substrate and, upon being peeled off the substrate, are damaged to become non-reusable.

The laminate according to the third aspect of the invention withstands use under high temperatures of 150° C. or higher and is laser-markable such that the pigmented layer thereof is ablated on imagewise irradiation with laser light to expose the irradiated part of the base layer whereby to achieve desired marking.

The invention claimed is:

1. A laser-markable, acrylic resin-based laminate comprising:
   a pigmented layer being made of a crosslinked acrylic resin obtained by crosslinking an acrylic resin composition with a melamine crosslinking agent and being adapted to provide the outermost surface of the laminate when attached to a substrate, the acrylic resin composition having a hydroxyl value of 10 to 100 mg KOH/g and comprising an acrylic polymer having a reactive functional group, cellulose acetate butyrate, and a pigment, a base layer laminated with the pigmented layer being made of a crosslinked acrylic resin obtained by crosslinking an acrylic resin composition with an isocyanate crosslinking agent and providing a visibly distinguishable color difference from the pigmented layer, the acrylic resin composition having a hydroxyl value of 18 to 40 mg KOH/g and comprising an acrylic polymer having a reactive functional group, a glycol compound, and a coloring material containing an acrylic resin having a reactive hydroxyl group and a pigment dispersed in the acrylic resin, and a destructible layer laminated with the base layer, being made of a crosslinked acrylic resin obtained by crosslinking a mixture of an acrylic resin composition and polymer beads with an isocyanate crosslinking agent, the acrylic resin composition having a hydroxyl value of 20 to 35 mg KOH/g and comprising an acrylic polymer having a reactive functional group, a glycol compound, and a coloring material containing an acrylic resin having a reactive hydroxyl group and a pigment dispersed in the acrylic resin, wherein the laminate has a thickness of 100 to 200 μm.

2. The laser-markable, acrylic resin-based laminate according to claim 1, wherein the amount of the isocyanate crosslinking agent of each of the base layer and the destructible layer is 1.1 to 1.3 equivalent weights based on the hydroxyl value of the acrylic resin composition of the respective layers.

3. A laser-markable label comprising the laser-markable, acrylic resin-based laminate according to claim 1 and an adhesive layer on the side of the laminate opposite to the pigmented layer.

4. The laser-markable label according to claim 3, being adapted to be imagewise irradiated with laser light to ablate the pigmented layer to form an image and attached to a substrate, the imaged pigmented layer being adapted to be destroyed to make the label non-reusable when the label is peeled off the substrate.

5. A laser-markable label comprising the laser-markable, acrylic resin-based laminate according to claim 2 and an adhesive layer on the side of the laminate opposite to the pigmented layer.

* * * * *